US011109267B2

(12) United States Patent
Yoshimoto et al.

(10) Patent No.: US 11,109,267 B2
(45) Date of Patent: Aug. 31, 2021

(54) BASE STATION APPARATUS, TERMINAL APPARATUS, AND COMMUNICATION METHOD FOR THESE APPARATUSES

(71) Applicants: SHARP KABUSHIKI KAISHA, Sakai (JP); FG INNOVATION COMPANY LIMITED, Tuen Mun (HK)

(72) Inventors: Takashi Yoshimoto, Sakai (JP); Osamu Nakamura, Sakai (JP); Jungo Goto, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 98 days.

(21) Appl. No.: 16/621,637

(22) PCT Filed: Jun. 15, 2018

(86) PCT No.: PCT/JP2018/022902
§ 371 (c)(1),
(2) Date: Dec. 11, 2019

(87) PCT Pub. No.: WO2018/230701
PCT Pub. Date: Dec. 20, 2018

(65) Prior Publication Data
US 2020/0213901 A1 Jul. 2, 2020

(30) Foreign Application Priority Data
Jun. 15, 2017 (JP) .............................. JP2017-117494

(51) Int. Cl.
*H04W 28/04* (2009.01)
*H04L 1/18* (2006.01)
*H04L 5/00* (2006.01)

(52) U.S. Cl.
CPC ........... *H04W 28/04* (2013.01); *H04L 1/1812* (2013.01); *H04L 5/0048* (2013.01)

(58) Field of Classification Search
CPC ... H04L 1/1812; H04L 5/0048; H04L 1/1851; H04L 1/189; H04L 27/26; H03M 13/09; H04W 28/04
See application file for complete search history.

(56) References Cited

U.S. PATENT DOCUMENTS 9,794,921 B2 * 10/2017 Nimbalker ........ H04W 72/0446
10,412,719 B2 * 9/2019 Chen .................... H04L 5/0048
(Continued)

FOREIGN PATENT DOCUMENTS

EP    3430838 A1    1/2019

OTHER PUBLICATIONS

"Performance Evaluation of Grant-free Transmission for Uplink URLLC Services"; 2017 IEEE 85th Vehicular Technology Conference (VTC Spring); Jun. 4-7, 2017; Wang et al. (Year: 2017).*
(Continued)

*Primary Examiner* — Benjamin H Elliott, IV
(74) *Attorney, Agent, or Firm* — ScienBiziP, P.C.

(57) ABSTRACT

A base station apparatus receives an uplink shared channel and a reference signal, the uplink shared channel including uplink data, an identifier of a terminal apparatus that has transmitted the uplink data, a first CRC generated from the identifier bits, and a second CRC generated from the uplink data bits. In a case that an error is detected based on the first CRC, the base station apparatus transmits a first NACK by using a control signal associated with the reference signal sequence. In a case that an error is detected based on the second CRC, the base station apparatus transmits a second NACK by using a control signal associated with the identifier indicating the terminal apparatus.

7 Claims, 9 Drawing Sheets

(56) References Cited

U.S. PATENT DOCUMENTS

| | | | |
|---|---|---|---|
| 10,735,136 B2* | 8/2020 | Yoshimoto | H04W 72/0466 |
| 2014/0126507 A1* | 5/2014 | Takahashi | H04L 1/08 370/329 |
| 2016/0270102 A1* | 9/2016 | Zeng | H04W 72/1231 |
| 2018/0123765 A1* | 5/2018 | Cao | H04L 1/1896 |
| 2019/0230691 A1* | 7/2019 | Cao | H04W 72/1268 |
| 2019/0363834 A1* | 11/2019 | Cao | H04L 1/1819 |
| 2020/0213901 A1* | 7/2020 | Yoshimoto | H04L 1/189 |

OTHER PUBLICATIONS

"Discussions on uplink grant-free transmission"; 3GPP TSG RAN WG1 Meeting #88 R1-1701962 Athens, Greece, Feb. 13-17, 2017; Guangdong OPPO Mobile Telecom (Year: 2017).*

"URLLC and eMBB DL Multiplexing using CRC masking and multibit NACK feedback"; 3GPP TSG RAN WG1 Meeting #88 R1-1702745 Athens, Green Feb. 13-17, 2017; MediaTek (Year: 2017).*

"3rd Generation Partnership Project; Technical Specification Group Radio Access Network; Study on scenarios and requirements for next generation access technologies; (Release 14)", 3GPP TR 38.913 V14.2.0 (Mar. 2017).

"3rd Generation Partnership Project; Technical Specification Group Radio Access Network; Study on new radio (NR) access technology; Physical Layer Aspects (Release 14)", 3GPP TR 38.802 V2.0.0 (Mar. 2017).

Huawei et al., "The retransmission and HARQ schemes for grant-fee", R1-1608859, 3GPP TSG RAN WG1 Meeting #186bis, Lisbon, Portugal, Oct. 10-14, 2016.

* cited by examiner

| UE ID | CRC#1 | UPLINK DATA | CRC#2 |

FIG. 5

BASE STATION APPARATUS, TERMINAL APPARATUS, AND COMMUNICATION METHOD FOR THESE APPARATUSES

TECHNICAL FIELD

The present invention relates to a base station apparatus, a terminal apparatus, and a communication method for these apparatuses.

This application claims priority based on JP 2017-117494 filed on Jun. 15, 2017, the contents of which are incorporated herein by reference.

BACKGROUND ART

In the Third Generation Partnership Project (3GPP), as the fifth generation mobile communication systems (5G), specification of a radio multiple access scheme has been in progress. The radio multiple access scheme satisfies three use case requirements, specifically, enhanced Mobile Broadband (eMBB) for allowing high capacity communication with high spectral efficiency, massive Machine Type Communication (mMTC) for allowing accommodation of a large number of terminals, and Ultra-Reliable and Low Latency Communication (uRLLC) for realizing high reliability and low latency communication (NPL 1). In (5G) communication systems, to satisfy the requirement of uRLLC, in an uplink, uplink data transmission (grant-free transmission) that does not use an uplink transmission grant (UL Grant) has been studied, as well as uplink data data (grant-based transmission) that uses a UL Grant (NPL 2).

In the grant-based transmission, a terminal apparatus requests radio resources for transmitting uplink data to a base station apparatus, by using a Scheduling Request (SR) or the like. The terminal apparatus transmits a Buffer Status Report (BSR). The BSR is a signal for reporting an amount of packets stored in a transmission buffer in a terminal apparatus. The base station apparatus provides a UL Grant to each terminal apparatus, based on the SR and the BSR. In a case that the terminal apparatus receives control information related to a UL Grant from the base station apparatus, the terminal apparatus transmits uplink data, in accordance with radio resource allocation indicated by uplink transmission parameters included in the UL Grant.

In a case that the base station apparatus correctly receives the uplink data, the base station apparatus transmits an Acknowledgement (ACK) to the terminal apparatus in a downlink after a prescribed period of time has passed from the reception of the uplink data. In contrast, in a case that the base station apparatus fails to correctly receive the uplink data, the base station apparatus transmits a Negative Acknowledgement (NACK) to the terminal apparatus after a prescribed period of time has passed from the reception of the uplink data. The terminal apparatus that has received the NACK retransmits data associated with the uplink data. In this manner, the base station apparatus controls all of the uplink data transmissions (data transmissions from the terminal apparatus to the base station apparatus). Through such a control on uplink radio resources performed by the base station apparatus, Orthogonal Multiple Access (OMA) is achieved.

By contrast, in the grant-free transmission, a terminal apparatus transmits uplink data to a base station apparatus, without receiving indication of radio resource allocation for transmitting uplink data with a UL Grant. The grant-free transmission allows Non-Orthogonal Multiple Access (NOMA), in which multiple terminal apparatuses perform uplink data transmission by using the same frequency resource, time resource, coding resource, and spatial resource (multiple terminal apparatuses non-orthogonally multiplex uplink data).

CITATION LIST

Non Patent Literature

NPL 1: "3rd Generation Partnership Project; Technical Specification Group Radio Access Network; Study on Scenarios and Requirements for Next Generation Access Technologies; (Release 14)" 3GPP TR 38.913 v14.2.0 (2017-05)

NPL 2: "3rd Generation Partnership Project; Technical Specification Group Radio Access Network; Study on New Radio (NR) Access Technology; Physical Layer Aspects (Release 14)" 3GPP TR 38.802 v2.0.0 (2017-03)

SUMMARY OF INVENTION

Technical Problem

In the grant-free transmission, however, the terminal apparatus transmits uplink data, without receiving indication of radio resource allocation with a UL Grant. Therefore, in Non-Orthogonal Multiple Access, the base station apparatus needs to perform retransmission control on transmission of ACK/NACKs or the like, for uplink data for which uplink resource allocation or the like is not controlled (i.e., uplink data that is not entirely clear as to uplink radio resources used for its transmission).

One aspect of the present invention has been made in view of the circumstances as described above, and has an object to provide a base station apparatus, a terminal apparatus, and a communication method that can efficiently perform retransmission control for uplink data that is not clear as to uplink radio resources used for its transmission in grant-free transmission.

Solution to Problem

In order to solve the problems described above, a configuration of a base station apparatus, a terminal apparatus, and a communication method according to one aspect of the present invention is as follows.

(1) One aspect of the present invention is a base station apparatus for communicating with a terminal apparatus, the base station apparatus including: a receiver configured to receive a physical uplink shared channel, and a reference signal used to demodulate the physical uplink shared channel; and a transmitter configured to transmit a signal indicating a delivery confirmation for the physical uplink shared channel, wherein the physical uplink shared channel includes uplink data bits, identifier bits indicating a terminal apparatus that has transmitted the uplink data, first Cyclic Redundancy Check (CRC) bits generated from the identifier bits, and second CRC bits generated from the uplink data bits, in a case that an error is detected based on the first CRC bits, the transmitter transmits a first Negative Acknowledgement (NACK) by using a control signal associated with a sequence of the reference signal, and in a case that an error is detected based on the second CRC bits, the transmitter transmits a second NACK by using a control signal associated with an identifier indicating the terminal apparatus.

(2) In one aspect of the present invention, the transmitter transmits resource configuration information including number of times the physical uplink shared channel is repeatedly transmitted, by using the control signal associated with the sequence of the reference signal.

(3) In one aspect of the present invention, the receiver multiplies a bit indicating the first NACK by a spreading code sequence identified by using cyclic shift performed on the sequence of the reference signal, and generates the control signal associated with the sequence of the reference signal, and the receiver adds, to a bit indicating the second NACK, CRC bits scrambled with the identifier indicating the terminal apparatus, and generates the control signal associated with the identifier indicating the terminal apparatus.

(4) In one aspect of the present invention, the receiver adds, to a bit indicating the first NACK, CRC bits scrambled with an identifier generated by using radio resources to which the sequence of the reference signal is mapped, and generates the control signal associated with the sequence of the reference signal, and the receiver adds, to a bit indicating the second NACK, CRC bits scrambled with the identifier indicating the terminal apparatus, and generates the control signal associated with the identifier indicating the terminal apparatus.

(5) One aspect of the present invention is a communication method used for a base station apparatus for communicating with a terminal apparatus, the communication method including: a reception step of receiving a physical uplink shared channel, and a reference signal used to demodulate the physical uplink shared channel; and a transmission step of transmitting a signal indicating a delivery confirmation for the physical uplink shared channel, wherein the physical uplink shared channel includes uplink data bits, identifier bits indicating a terminal apparatus that has transmitted the uplink data, first CRC bits generated from the identifier bits, and second CRC bits generated from the uplink data bits, in the reception step, the first CRC bits are descrambled by using a sequence of the reference signal, and the second CRC bits are descrambled by using an identifier indicating the terminal apparatus, in the transmission step, in a case that an error is detected based on the first CRC bits, a first NACK is transmitted by using a control signal associated with the sequence of the reference signal, and in a case that an error is detected based on the second CRC bits, a second NACK is transmitted by using a control signal associated with the identifier indicating the terminal apparatus.

(6) One aspect of the present invention is a terminal apparatus for communicating with a base station apparatus, the terminal apparatus including: a transmitter configured to transmit a physical uplink shared channel, and a reference signal used to demodulate the physical uplink shared channel; and a receiver configured to receive a signal indicating a delivery confirmation for the physical uplink shared channel, wherein the physical uplink shared channel includes uplink data bits, identifier bits indicating a terminal apparatus that has transmitted the uplink data, first CRC bits generated from the identifier bits, and second CRC bits generated from the uplink data bits, the transmitter scrambles the first CRC bits by using a sequence of the reference signal, and scrambles the second CRC bits by using an identifier indicating the terminal apparatus, in a case that the receiver receives a NACK on a control signal associated with the sequence of the reference signal, the receiver interprets that identification of the terminal apparatus has failed, in a case that the receiver receives a NACK on a control signal associated with the identifier indicating the terminal apparatus, the receiver interprets that decoding of uplink data has failed, and in a case that the receiver receives neither of the control signals within a prescribed period of time, the receiver interprets that the reference signal has not been recognized.

(7) One aspect of the present invention is a communication method used for a terminal apparatus for communicating with a base station apparatus, the communication method including: a transmission step of transmitting a physical uplink shared channel, and a reference signal used to demodulate the physical uplink shared channel; and a reception step of receiving a signal indicating a delivery confirmation for the physical uplink shared channel, wherein the physical uplink shared channel includes uplink data bits, identifier bits indicating a terminal apparatus that has transmitted the uplink data, first CRC bits generated from the identifier bits, and second CRC bits generated from the uplink data bits, in the transmission step, the first CRC bits are scrambled by using a sequence of the reference signal, and the second CRC bits are scrambled by using an identifier indicating the terminal apparatus, in the reception step, in a case that a NACK is received on a control signal associated with the sequence of the reference signal, it is interpreted that identification of the terminal apparatus has failed, in a case that a NACK (is received on a control signal associated with the identifier indicating the terminal apparatus, it is interpreted that decoding of uplink data has failed, and in a case that neither of the control signals is received within a prescribed period of time, it is interpreted that the reference signal has not been recognized.

Advantageous Effects of Invention

According to one or more aspects of the present invention, retransmission control for uplink data that is not clear as to uplink radio resources used for its transmission can be efficiently performed in grant-free transmission.

BRIEF DESCRIPTION OF DRAWINGS

FIG. 5 is a diagram illustrating a format example of uplink data in grant-free transmission according to the first embodiment.

DESCRIPTION OF EMBODIMENTS

A communication system according the present embodiments includes a base station apparatus (a cell, a small cell, a serving cell, a component carrier, an eNodeB, a Home eNodeB, or a gNodeB) and a terminal apparatus (a terminal, a mobile terminal, or a User Equipment (UE)). In the communication system, in case of a downlink, the base station apparatus serves as a transmitting apparatus (a transmission point, a transmit antenna group, a transmit antenna port group, or a Tx/Rx Point (TRP)), and the terminal apparatus serves as a receiving apparatus (a reception point, a reception terminal, a receive antenna group, or a receive antenna port group). In a case of an uplink, the base station apparatus serves as a receiving apparatus, and the terminal apparatus serves as a transmitting apparatus. The communication system is also applicable to Device-to-Device (D2D) communication. In this case, the terminal apparatus serves both as a transmitting apparatus and as a receiving apparatus.

The communication system is not limited to data communication between the terminal apparatus and the base station apparatus, the communication involving human beings, but is also applicable to a form of data communication requiring no human intervention, such as Machine Type Communication (MTC), Machine-to-Machine (M2M) Communication, communication for Internet of Things (IoT), or Narrow Band-IoT (NB-IoT) (hereinafter referred to as MTC). In this case, the terminal apparatus serves as an MTC terminal. In the communication system, in an uplink and a downlink, a multi-carrier transmission scheme such as Cyclic Prefix—Orthogonal Frequency Division Multiplexing (CP-OFDM) can be used. In the communication system, in an uplink, a transmission scheme such as Discrete Fourier Transform Spread—Orthogonal Frequency Division Multiplexing (DFTs-OFDM, which may also be referred to as SC-FDMA) may be used. Note that the following describes a case that an OFDM transmission scheme is used in the uplink and the downlink. However, this is not restrictive, and other transmission schemes can be applied.

The base station apparatus and the terminal apparatus according to the present embodiments can communicate in a frequency band for which a permission has been obtained from the government of a country or a region where a radio operator provides service, i.e., a so-called licensed band, and/or in a frequency band that does not require a permission from the government of a country or a region, i.e., a so-called unlicensed band.

In the present embodiments, "X/Y" includes the meaning of "X or Y". In the present embodiments, "X/Y" includes the meaning of "X and Y". In the present embodiments, "X/Y" includes the meaning of "X and/or Y".

First Embodiment

Figure 1:
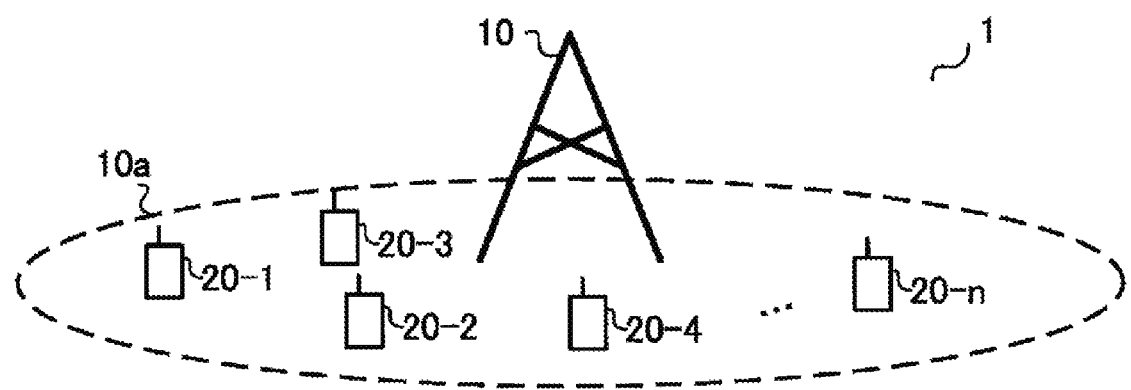
FIG. 1 is a diagram illustrating an example of a communication system according to a first embodiment.

FIG. 1 is a diagram illustrating an example of a communication system according to the present embodiment. A communication system 1 of the present embodiment includes a base station apparatus 10 and terminal apparatuses 20-1 to 20-$n$ ($n$ is a natural number). The terminal apparatuses 20-1 to 20-$n$ are also collectively referred to as a terminal apparatus 20. Coverage 10$a$ is a range (communication area) in which the base station apparatus 10 can connect to the terminal apparatus 20 (coverage 10$a$ is also referred to as a cell).

In the communication system 1, the base station apparatus 10 and the terminal apparatus 20 support grant-based transmission in a downlink. The base station apparatus 10 and the terminal apparatus 20 support grant-free (also referred to as grant-less, or contention-based) transmission in an uplink, as well as the grant-based transmission. In the grant-based transmission, in a case that the terminal apparatus 20 receives control information related to an uplink transmission grant (also referred to as a UL Grant, an uplink grant, a scheduling grant, or an uplink assignment) from the base station apparatus 10, the terminal apparatus 20 transmits uplink data in dynamic scheduling, in accordance with radio resource allocation indicated by an uplink transmission parameter included in the UL Grant. The dynamic scheduling indicates radio resource allocation with the UL Grant, for each transmitted uplink data (transport block).

In the grant-free transmission, the terminal apparatus 20 transmits uplink data (a physical uplink shared channel), without dynamically receiving indication of radio resource allocation with the UL Grant from the base station apparatus 10. The grant-free transmission allows uplink data transmitted by multiple terminal apparatuses to overlap (collide) in frequency, time, and spatial resources (Non-Orthogonal Multiple Access). In the grant-free transmission, the terminal apparatus 20 transmits uplink data together with an identification signal, so that the base station apparatus 10 can perform terminal identification. The following describes a case that the communication system uses a DMRS, which is used to demodulate uplink data, also as an identification signal.

The base station apparatus 10 detects an uplink data signal that each terminal apparatus has transmitted in grant-free transmission. To detect the uplink data signal, the base station apparatus 10 may be provided with Symbol Level Interference Cancellation (SLIC) in which interference is removed based on demodulation results of interference signals, Codeword Level Interference Cancellation (CWIC) in which interference is removed based on decoding results of interference signals, turbo equalization, maximum likelihood detection (Maximum likelihood (ML) or Reduced complexity Maximum likelihood (R-ML)) in which signals most likely to be interference signals are searched among transmit signal candidates, and Enhanced Minimum Mean Square Error-Interference Rejection Combining (EMMSE-IRC) in which interference signals are reduced through linear operation, for example. Transmit power of the above each uplink data signal may be configured to values different among terminal apparatuses, so that a received power difference is generated in the base station apparatus.

In FIG. 1, uplink radio communication includes the following uplink physical channels. The uplink physical channels are used to transmit information output from a higher layer.

Physical Uplink Control Channel (PUCCH)
Physical Uplink Shared Channel (PUSCH)
Physical Random Access Channel (PRACH)

The PUCCH is a physical channel used to transmit Uplink Control Information (UCI). The UCI includes a positive acknowledgement (ACK)/Negative acknowledgement (NACK) for downlink data (a Downlink transport block, a Medium Access Control Protocol Data Unit (MAC PDU), a Downlink-Shared Channel (DL-SCH), or a Physical Downlink Shared Channel (PDSCH)). The ACK/NACK is also referred to as a Hybrid Automatic Repeat request ACKnowledgement (HARQ-ACK), a HARQ feedback, a HARQ acknowledgement, HARQ control information, or a signal indicating a delivery confirmation.

The UCI includes downlink Channel State Information (CSI). The downlink channel state information includes a Rank Indicator (RI) indicating a preferable spatial multiplexing number (layer number), a Precoding Matrix Indicator (PMI) indicating a preferable precoder, a Channel Quality Indicator (CQI) specifying a preferable transmission rate, and the like. The PMI indicates a codebook determined by the terminal apparatus. The codebook is associated with precoding of a physical downlink shared channel. The CQI indicates a modulation scheme (e.g., Binary Phase Shift Keying (BPSK), Quadrature Phase Shift Keying (QPSK), 16-Quadrature amplitude modulation (QAM), 64QAM, 256QAM, and the like)), a coding rate, and spectral efficiency that are preferable in a prescribed bandwidth.

In the grant-based transmission, the UCI includes a Scheduling Request (SR) used to request a PUSCH (Uplink-Shared Channel (UL-SCH)) resource for initial transmission. The scheduling request includes a positive scheduling request, or a negative scheduling request. The positive scheduling request indicates to request a UL-SCH resource for initial transmission. The negative scheduling request indicates not to request the UL-SCH resource for the initial transmission.

The PUSCH is used to transmit Radio Resource Control (RRC) signaling. The RRC signaling is also referred to as an RRC message/RRC layer information/an RRC layer signal/an RRC layer parameter/an RRC information element. The RRC signaling is information/signal processed in a radio resource control layer. The RRC signaling transmitted from the base station apparatus may be signaling shared by multiple terminal apparatuses within a cell. The RRC signaling transmitted from the base station apparatus may be signaling dedicated to a certain terminal apparatus (also referred to as dedicated signaling). In other words, user-equipment-specific information (unique to user equipment) is transmitted using the signaling dedicated to a certain terminal apparatus. The RRC message can include a UE Capability of a terminal apparatus. The UE Capability is information indicating a function supported by the terminal apparatus.

The PUSCH is used to transmit a Medium Access Control Element (MAC CE). The MAC CE is information/signal processed (transmitted) in a Medium Access Control layer. For example, a power headroom may be included in the MAC CE, and may be reported via the physical uplink shared channel. In other words, a MAC CE field is used to indicate a level of the power headroom. The uplink data can include an RRC message and a MAC CE. The RRC signaling and/or the MAC CE is also referred to as higher layer signaling. The RRC signaling and/or the MAC CE is included in a transport block (PUSCH formats will be described later).

The PRACH is used to transmit a preamble used for a random access. The PRACH is used to transmit a random access preamble. The PRACH is used for indicating an initial connection establishment procedure, a handover procedure, a connection re-establishment procedure, synchronization (timing adjustment) for uplink transmission, and a request for a PUSCH (UL-SCH) resource.

In the uplink radio communication, an Uplink Reference Signal (UL RS) is used as an uplink physical signal. The uplink physical signal is not used to transmit information output from a higher layer, but is used by a physical layer. The uplink reference signal includes a Demodulation Reference Signal (DMRS) and a Sounding Reference Signal (SRS). The DMRS is associated with transmission of a PUSCH/PUCCH. For example, in a case that the base station apparatus 10 demodulates a PUSCH/PUCCH, the base station apparatus 10 uses the demodulation reference signal to perform channel estimation/channel compensation. The SRS is not associated with transmission of a PUSCH/PUCCH. The base station apparatus 10 uses the SRS to measure an uplink channel state (CSI Measurement).

In FIG. 1, in downlink radio communication, the following downlink physical channels can be used. The downlink physical channels are used to transmit information output from a higher layer.

Physical Broadcast Channel (PBCH)
Physical Hybrid ARQ Indicator Channel (PHICH)
Physical Downlink Control Channel (PDCCH)
Physical Downlink Shared Channel (PDSCH)

The PBCH is used to broadcast a Master Information Block (MIB) or a Broadcast Channel (BCH) shared by terminal apparatuses. The MIB is one of system information. For example, the MIB includes a downlink transmission bandwidth configuration and a System Frame number (SFN). The MIB may include information indicating at least a part of a slot number, a subframe number, and a radio frame number, in which the PBCH is transmitted.

The PHICH is used to transmit a HARQ indicator (a HARQ feedback, a delivery confirmation, or an ACK/NACK) indicating an ACKnowledgement (ACK) or a Negative ACKnowledgement (NACK) for uplink data (an Uplink Shared Channel (UL-SCH), a transport block, or a codeword) received by the base station apparatus 10. One HARQ indicator is transmitted in one transport block in uplink data. For example, a HARQ indicator an is expressed by one bit. Specifically, $a_n$="0" in a case of a NACK, and $a_n$="1" in a case of an ACK. The PHICH is generated by multiplying a HARQ indicator by a spreading code sequence.

The base station apparatus 10 performs repetition on the HARQ indicator. For example, in a case that repetition is performed three times, NACK "0" and ACK "1" are turned into a 3-bit sequence of "000" and "111", respectively, through repetition. Next, the bit sequence after the repetition is data-modulated (e.g., BPSK). Then, each of data-modulated symbols after the data modulation is multiplied (spread) by a prescribed sequence (spreading sequence). For example, in a case that a spreading sequence length is 4, the number of symbols after spreading is 12. For the spreading sequence, an orthogonal sequence (or a semi-orthogonal sequence) can be used.

The spreading sequence is associated with a DMRS transmitted in association with uplink data, or with radio resources in which the DMRS/the uplink data is transmitted. For example, a spreading sequence (n_seq) is selected, with a cyclic shift amount (n_DMRS) performed on a DMRS transmitted in association with uplink data being used as a generation parameter. The spreading sequence is also generated, with the position of resource allocation of the DMRS/the uplink data (PUSCH transport block) being used as a generation parameter. For example, for the resource allocation of a DMRS/uplink data, the smallest resource block index (I_RA, which is an index indicating the position of a mapped frequency) in the first slot in which the DMRS/the uplink data is transmitted can be used. For example, an index n_seq indicating a spreading sequence used to multiply a PHICH is expressed as n_seq=(floor (I_RA/N_PHICH+n_DMRS))mod(2×N_SF). floor indicates that an arithmetic result is rounded down. N_PHICH indicates a number to which a PHICH is mapped in one slot. N_SF is a spreading code length.

The symbol multiplied by the spreading sequence is mapped to prescribed radio resources (time/frequency). Radio resources n_RB to which the symbol multiplied by the spreading sequence is mapped are configured, with a cyclic shift amount performed on a DMRS transmitted in association with the uplink data being used as a parameter. Radio resources to which the symbol multiplied by the spreading sequence is mapped are configured, with the position of resource allocation of the uplink data (PUSCH transport block) being used as a parameter.

The PDCCH is used to transmit Downlink Control Information (DCI). For the downlink control information, multiple formats (also referred to as DCI formats) based on applications are defined. The DCI format may be defined based on a type of DCI or the number of bits constituting one DCI format. Each format is used according to an application. The downlink control information includes control information for downlink data transmission and control information for uplink data transmission. The DCI format for downlink data transmission is also referred to as a downlink assignment (or a downlink grant). The DCI format for uplink data transmission is also referred to as an uplink grant (or an uplink assignment).

One downlink assignment is used for scheduling of one PDSCH in one serving cell in grant-based transmission. The downlink grant may be used at least for scheduling of a PDSCH in the same slot as the slot on which the downlink grant is transmitted. The downlink assignment includes downlink control information, such as resource block assignment for a PDSCH, a Modulation and Coding Scheme (MCS) for a PDSCH, a NEW Data Indicator (NDI) indicating initial transmission or retransmission, information indicating a downlink HARQ process number, and a Redundancy version indicating the amount of redundancy added to a codeword at the time of turbo coding. The codeword is data after error correction coding. Note that the downlink assignment may include a Transmission Power Control (TPC) command for a PUCCH, and a TPC command for a PUSCH. Note that the DCI format for each downlink data transmission includes information (fields) necessary for its application, out of the information described above.

The downlink assignment may include information related to retransmission for a PUSCH (a transport block or a codeword) in grant-free transmission. The information related to retransmission of a PUSCH may include a HARQ indicator, (or a New Date Indicator (NDI)), information indicating retransmission timing, information of a frequency resource for retransmission, and the like.

The downlink assignment may include resource configuration in grant-free transmission. The resource configuration in grant-free transmission includes a time/frequency resource that allows the terminal apparatus to perform grant-free transmission, a Modulation and coding scheme (MCS), a Redundancy Version (RV), parameters related to a De-Modulation Reference Signal (DMRS) (a cyclic shift amount of a DMRS, an Orthogonal Cover Code (OCC) performed on a DMRS, and the like), the number of times of repetition of one PUSCH (transport block), and the like. The resource configuration in grant-free transmission may be used to modify resource configuration in grant-free transmission that is notified in RRC signaling.

One uplink grant is used to notify the terminal apparatus of scheduling of one PUSCH within one serving cell in grant-based transmission. The uplink grant is also used in a case that transmission is switched from grant-free transmission (initial transmission) to grant-based transmission (retransmission). The uplink grant includes uplink control information, such as information related to resource block assignment to transmit a PUSCH (resource block assignment and hopping resource allocation), information related to an MCS of a PUSCH (MCS/Redundancy version), an amount of cyclic shift performed on a DMRS, information related to PUSCH retransmission, and a TPC command for a PUSCH, and downlink Channel State Information (CSI) request (CSI request). The uplink grant may include information indicating an uplink HARQ process number, a HARQ indicator/an NDI, a Transmission Power Control (TPC) command for a PUCCH, and a TPC command for a PUSCH.

The uplink grant may include resource configuration for grant-free transmission. The resource configuration for grant-free transmission includes a time/frequency resource that allows the terminal apparatus to perform grant-free transmission, an MCS, an RV, parameters related to a DMRS (a cyclic shift amount of a DMRS, an Orthogonal Cover Code (OCC) performed on a DMRS, and the like), the number of times one PUSCH (transport block) is repeatedly transmitted, and the like. The resource configuration for grant-free transmission may be used to modify resource configuration for grant-free transmission that is notified in RRC signaling.

The PDCCH is generated by adding a Cyclic Redundancy Check (CRC) to downlink control information. In the PDCCH, CRC parity bits are scrambled by using a prescribed identifier (a Radio Network Temporary Identifier (RNTI)) indicating a terminal apparatus as a destination (scrambling is also referred to as exclusive OR operation or masking). The parity bits are scrambled with a Cell-RNTI (C-RNTI), a Semi Persistent Scheduling (SPS) C-RNTI, a Temporary C-RNTI, a Paging (P)-RNTI, a System Information (SI)-RNTI, or a Random Access (RA)-RNTI. The C-RNTI and the SPS C-RNTI are identifiers for identifying a terminal apparatus within a cell. The Temporary C-RNTI is an identifier for identifying a terminal apparatus that has transmitted a random access preamble during a contention based random access procedure. The C-RNTI and the Temporary C-RNTI are used to control PDSCH transmission or PUSCH transmission in a single subframe. The SPS C-RNTI is used to periodically allocate a PDSCH or PUSCH resource. The P-RNTI is used to transmit a paging message (Paging Channel (PCH)). The SI-RNTI is used to transmit an SIB. The RA-RNTI is used to transmit a random access response (message 2 in a random access procedure).

The PDSCH is used to transmit downlink data (a downlink transport block or a DL-SCH). The PDSCH is used to transmit system information message (also referred to as a System Information Block (SIB). The system information message may include an SIB specific to grant-free transmission. The SIB specific to grant-free transmission includes the resource configuration for grant-free transmission. A part or all of the SIBs can be included in an RRC message.

The PDSCH is used to transmit RRC signaling. The RRC signaling transmitted from the base station apparatus may be shared (cell-specific) by multiple terminal apparatuses within a cell. In other words, information shared by user equipment within the cell is transmitted by using RRC signaling specific to the cell. The RRC signaling transmitted from the base station apparatus may be a message dedicated to a certain terminal apparatus (also referred to as dedicated signaling). In other words, user-equipment-specific information (unique to user equipment) is transmitted by using a message dedicated to a certain terminal apparatus. The RRC signaling may include the resource configuration for grant-free transmission.

The PDSCH is used to transmit a MAC CE. The RRC signaling and/or the MAC CE is also referred to as higher layer signaling. A PMCH is used to transmit multicast data (Multicast Channel (MCH)).

In the downlink radio communication of FIG. 1, a Synchronization signal (SS) and a Downlink Reference Signal (DL RS) are used as downlink physical signals. The downlink physical signals are not used to transmit information output from a higher layer, but are used by a physical layer.

The synchronization signal is used for the terminal apparatus to establish synchronization in the frequency domain and the time domain in the downlink. The downlink reference signal is used for the terminal apparatus to perform channel estimation/channel compensation of a downlink physical channel. For example, the downlink reference signal is used to demodulate a PBCH, a PDSCH, a PDCCH, and the like. The downlink reference signal can also be used for the terminal apparatus to measure a downlink channel state (CSI measurement).

The downlink physical channel and the downlink physical signal are also collectively referred to as a downlink signal. The uplink physical channel and the uplink physical signal are also collectively referred to as an uplink signal. The downlink physical channel and the uplink physical channel are also collectively referred to as a physical channel. The downlink physical signal and the uplink physical signal are also collectively referred to as a physical signal.

The BCH, the UL-SCH, and the DL-SCH are transport channels. Channels used in the MAC layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing and the like are performed on each codeword.

Figure 2:
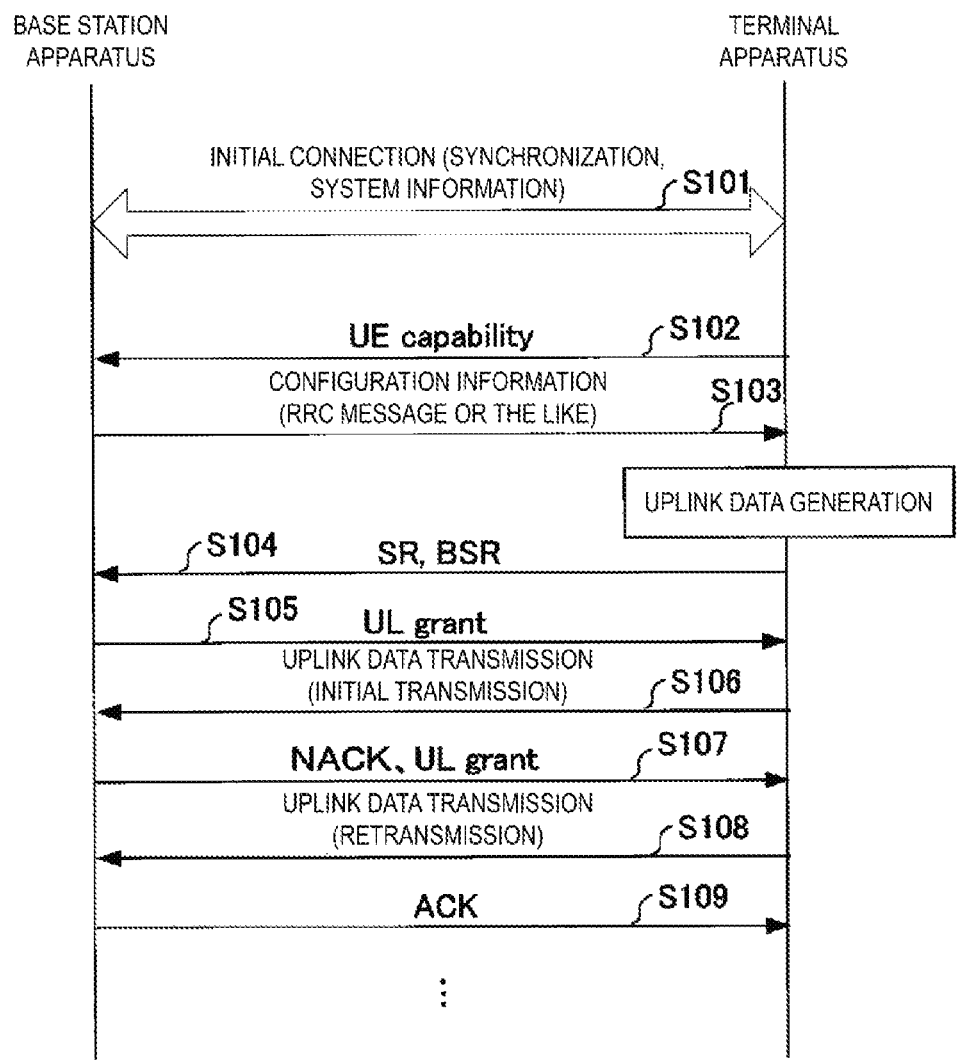
FIG. 2 is a diagram illustrating a sequence example between a base station apparatus and a communication apparatus in grant-based transmission according to the first embodiment.

FIG. 2 is a diagram illustrating a sequence example between a base station apparatus and a communication apparatus in grant-based transmission according to the present embodiment. In the downlink, the base station apparatus 10 periodically transmits a synchronization signal and a PBCH, in accordance with a prescribed radio frame format. The terminal apparatus 20 performs initial connection, by using the synchronization signal, the PBCH, system information included in the PBCH and RRC signaling, and the like (S101). The terminal apparatus 20 performs frame synchronization and symbol synchronization in the downlink, by using the synchronization signal. The terminal apparatus 20 identifies system information such as a downlink system bandwidth, a system frame number, and an antenna port number, by using the PBCH, the RRC signaling, and the like.

In S101, the terminal apparatus 20 can perform a random access to acquire a resource for uplink synchronization and an RRC connection request. The terminal apparatus 20 transmits a physical random access channel (a random access preamble) to the base station apparatus 10. The base station apparatus that has received the physical random access channel transmits a random access response. The base station apparatus 10 can include a UE ID (e.g., a T C-RNTI) in the random access response. The terminal apparatus 20 that has received the random access response transmits a higher layer connection request (RRC connection request or message 3). The base station apparatus 10 that has received the higher layer connection request transmits control information (RRC connection setup, Contention resolution, or message 4) for higher layer connection to the terminal apparatus 20. In a case that the terminal apparatus 20 correctly receives message 4, the UE ID transmitted in message 2 is used as an identifier in grant-based transmission (e.g., a C-RNTI).

The terminal apparatus 20 transmits UE Capability (S102). The UE Capability is information for notifying the base station apparatus 10 of a function supported by the terminal apparatus. The UE Capability is transmitted by using an RRC message or the like. The base station apparatus 10 transmits configuration information related to radio resource control to the terminal apparatus 20 (S103).

In a case that uplink data is generated, the terminal apparatus 20 transmits a scheduling request (SR) and a buffer status report (BSR) (S104). The base station apparatus 10 performs radio resource allocation for uplink data (a transport block) for each terminal apparatus, in consideration of the BSR and the like. The base station apparatus 10 transmits a UL Grant to the terminal apparatus 20, by using DCI (S105). The terminal apparatus 20 transmits uplink data in prescribed radio resources, based on transmission parameters (uplink resource allocation, an MCS, an NDI, and the like) for uplink data included in the UL Grant (S106). The base station apparatus 10 transmits an ACK/NACK for the uplink data (S107). The ACK/NACK is transmitted for each transport block. S107 in FIG. 2 is a case that a NACK is transmitted. The base station apparatus 10 transmits a UL grant including retransmission parameters (uplink resource allocation, an MCS, an RV, an NDI, and the like) of the uplink data. In a case that the terminal apparatus 20 receives a NACK, the terminal apparatus 20 retransmits uplink data (S108). The retransmitted uplink data may be the same as the uplink data transmitted in the initial transmission (data bits and parity bits transmitted in the initial transmission), or may be data not transmitted in the initial transmission (data bits and parity bits not transmitted in the initial transmission). The retransmitted uplink data may be data including both of the uplink data transmitted in the initial transmission and data not transmitted in the initial transmission. In S108, in a case that an ACK is received, the terminal apparatus transmits (initial transmission) new uplink data.

In a case of retransmission, the base station apparatus 10 performs signal detection processing, by using the uplink data received in S106 (initial transmission) and the downlink data received in S108 (retransmission). In the detection processing, the base station apparatus can use Chase combining and Incremental Redundancy (IR). The base station apparatus transmits an ACK/NACK for the detection processing (S109). S109 in FIG. 2 is a case that an ACK is transmitted.

Figure 3:
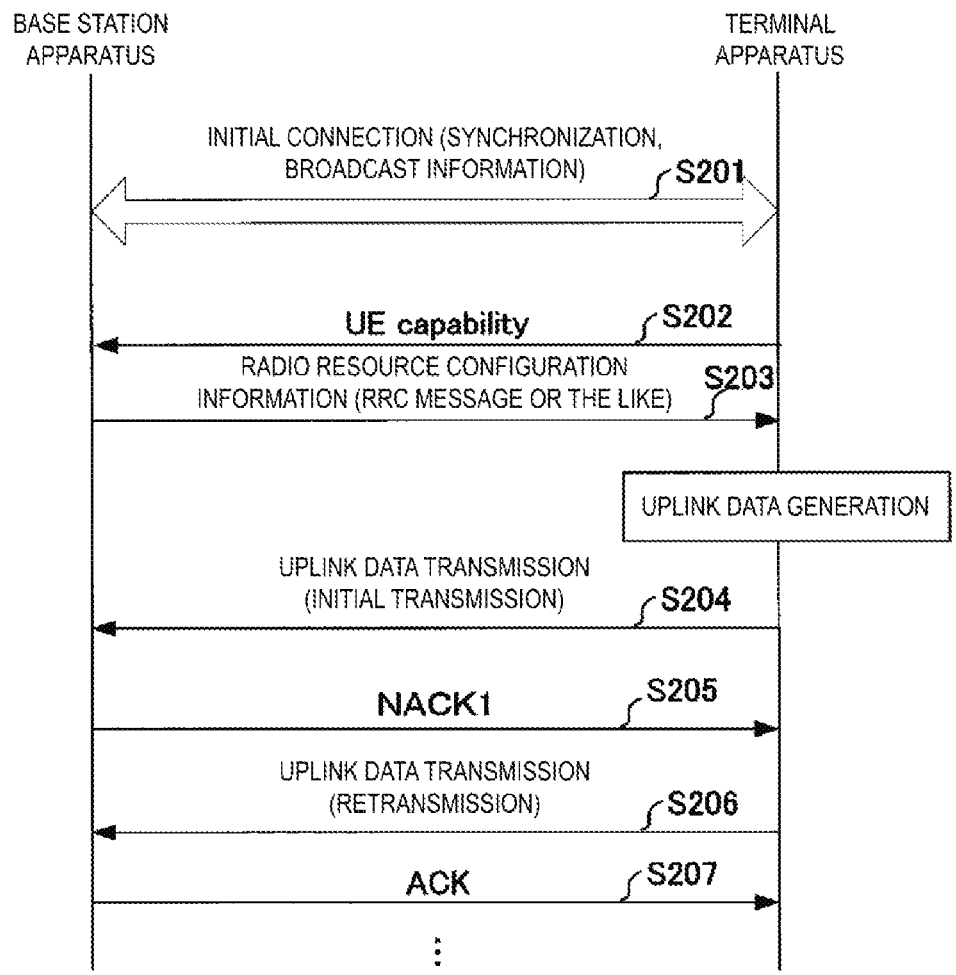
FIG. 3 is a diagram illustrating a sequence example between a base station apparatus and a communication apparatus in grant-free transmission according to the first embodiment.

FIG. 3 is a diagram illustrating a sequence example between a base station apparatus and a communication apparatus in grant-free transmission according to the present embodiment. In the downlink, the base station apparatus 10 periodically transmits a synchronization signal and a PBCH, in accordance with a prescribed radio frame format. The terminal apparatus 20 performs initial connection, by using the synchronization signal, system information included in the PBCH and RRC signaling, and the like (S201). The terminal apparatus 20 performs frame synchronization and symbol synchronization in the downlink, by using the synchronization signal. The terminal apparatus 20 determines system information such as a downlink system bandwidth and a System Frame Number (SFN), by using the PBCH and the like. The system information included in the PBCH and RRC signaling may include configuration information for grant-free transmission (resource configuration for grant-free transmission and the like).

In S201, the terminal apparatus 20 can perform a random access to acquire a resource for uplink synchronization and an RRC connection request. The terminal apparatus 20 transmits a physical random access channel (a random access preamble) to the base station apparatus 10. The base station apparatus that has received the physical random access channel transmits a random access response. The base station apparatus 10 can include a UE ID (e.g., a Temporary C-RNTI) in the random access response. The terminal apparatus 20 that has received the random access response transmits a higher layer connection request (RRC connection request or message 3). The base station apparatus 10 that has received the higher layer connection request transmits control information (RRC connection setup, Contention resolution, or message 4) for higher layer connection to the terminal apparatus 20. In a case that the terminal apparatus 20 correctly receives message 4, the UE ID transmitted in message 2 is used as an identifier in grant-based transmission, and is also used as an identifier of grant-free transmission (e.g., a C-RNTI).

Next, the terminal apparatus 20 transmits UE Capability (S202). The base station apparatus 10 can identify whether the terminal apparatus 20 supports grant-free transmission, by using the UE Capability. For example, the UE Capability is transmitted by using an RRC message or the like.

The base station apparatus transmits configuration information related to radio resource control to the terminal apparatus (S203). The configuration information for radio resource control is transmitted by using RRC signaling. The configuration information related to radio resource control can also include configuration information related to grant-free transmission. The configuration information related to grant-free transmission includes resource configuration for grant-free transmission. The resource configuration for grant-free transmission includes a time/frequency resource that allows the terminal apparatus to perform grant-free transmission, an MCS, an RV, parameters related to a DMRS (a cyclic shift amount of a DMRS, an Orthogonal Cover Code (OCC) performed on a DMRS, and the like), the number of times of repetition of transmission of one PUSCH (transport block), and the like.

The resource configuration for grant-free transmission may include transmission timing (transmission start point) indicating a subframe/slot/subframe in which PUSCH transmission using grant-free is started, and a transmission cycle. The transmission start point may be indicated by time (subframe/slot/subframe) at (in) which a PUSCH is transmitted after the resource configuration for grant-free transmission is received. The terminal apparatus 20 can use the time at which a PUSCH is transmitted as a PUSCH transmission cycle in grant-free. The terminal apparatus 20 performs the PUSCH transmission the number of times of repetition described above, for each PUSCH transmission cycle in the grant-free.

The resource configuration for grant-free transmission may include a PUSCH transmission cycle. In this case, the terminal apparatus 20 transmits a PUSCH in the PUSCH transmission cycle, in reference to the transmission start point. Note that a part or all of the configuration information related to grant-free transmission may be notified through DCI. The part or all of the configuration information related to grant-free transmission may be modified through DCI.

DCI may be used for activation of grant-free transmission. The terminal apparatus 20 that has received the resource configuration for grant-free transmission with RRC signaling can use time that is a prescribed period of time after the reception as a PUSCH start point in grant-free, in reference to the DCI. The prescribed period of time may be a period of time configured in advance in the communication system 1, or may be notified to the terminal apparatus 20 by the base station apparatus 10 with RRC signaling.

In a case that uplink data is generated, the terminal apparatus 20 supporting grant-free transmission transmits the uplink data, based on the resource configuration for grant-free transmission, without acquiring a UL Grant from the base station apparatus 10 (without transmitting an SR) (S204). In other words, in a case that uplink data is not generated at PUSCH transmission timing indicated by the PUSCH transmission cycle, the terminal apparatus 20 can skip PUSCH transmission. The uplink data is transmitted together with a DMRS. In S204, the terminal apparatus 20 transmits a DMRS and the uplink data, in accordance with the resource configuration for grant-free transmission received in S203. The base station apparatus 10 identifies the terminal apparatus 20 by using the DMRS and the like, and detects (decodes) the uplink data transmitted by the terminal apparatus 20.

Next, the base station apparatus 10 transmits an ACK/NACK for the uplink data (S205). In a case that the base station apparatus 10 correctly detects the uplink data, the base station apparatus 10 transmits an ACK to the terminal apparatus 20. In contrast, in a case that the base station apparatus 10 fails to correctly detect the uplink data, the base station apparatus 10 transmits a NACK to the terminal apparatus 20. Here, the base station apparatus 10 can transmit different NACKs, depending on a cause of an error. In S204, in a case that the base station apparatus 10 fails to recognize the presence of the DMRS (in a case that the base station apparatus 10 fails to detect the DMRS), the base station apparatus 10 does not transmit a NACK (Silent NACK). In S204, in a case that the base station apparatus 10 recognizes the presence of the DMRS but the recognition is not correct (in a case of an error of terminal identification), the base station apparatus 10 transmits a NACK indicating this matter (NACK 1). In S204, in a case that the base station apparatus 10 successfully correctly recognizes the presence of the DMRS (terminal identification is successful) but fails to decode the uplink data (in a case of an error of data decoding), the base station apparatus 10 transmits a NACK indicating this matter (NACK 2). S205 in FIG. 3 is a case that the base station apparatus transmits NACK 1.

In a case that the terminal apparatus 20 receives any of the NACKs in S205, the terminal apparatus 20 retransmits uplink data, in accordance with the received NACK (S206). The terminal apparatus 20 can change radio resources/DMRS/transmission method (grant-free transmission or grant-based transmission) to be used for retransmission, in accordance with a NACK. In a case that the terminal apparatus 20 receives a Silent NACK (in a case that the terminal apparatus 20 does not receive a NACK within a prescribed period of time), the terminal apparatus 20 retransmits uplink data together with a DMRS the same as the DMRS of the initial transmission in grant-free transmission, by using radio resources different from the radio resources in the initial transmission. The prescribed period of time is a period of time (timer) for which the terminal apparatus 20 waits to receive a NACK. The prescribed period of time may be configured in advance in the communication system 1, or may be notified to the terminal apparatus 20 from the base station apparatus 10 with RRC signaling. In a case that the terminal apparatus 20 receives a Silent NACK, the terminal apparatus 20 may increase density of a DMRS, and retransmit uplink data in grant-free transmission. In a case that the terminal apparatus 20 receives NACK 1, the terminal apparatus 20 retransmits uplink data together with a DMRS different from the DMRS in the initial transmission in grant-free transmission, by using radio resources the same as the radio resources in the initial transmission. In a case that the terminal apparatus 20 receives NACK 2, the terminal apparatus 20 retransmits uplink data in grant-based transmission. The terminal apparatus 20 retransmits uplink data, in accordance with the radio resource allocation used for grand-based transmission, the MCS, and the RV that are received together with NACK 2. In a case of NACK 2, for the retransmitted uplink data, data different from data bits and parity bits transmitted in the initial transmission may be transmitted. In a case of NACK 2, the retransmitted uplink data may be data including both of the data bits and parity bits transmitted in the initial transmission and data bits and parity bits not transmitted in the initial transmission. In S205, in a case that the terminal apparatus 20 receives an ACK, the terminal apparatus 20 ends repeated transmission of uplink data by grant-free. Then, in a case that there is another uplink data to be transmitted, the terminal apparatus 20 transmits new uplink data (initial transmission).

For the uplink data (retransmission) received in S206, the base station apparatus 10 performs terminal identification using the DMRS and the like, and data detection. For the retransmitted uplink data in the case of NACK 2, the base station apparatus 10 can perform HARQ combining (Chase Combining, Incremental Redundancy, and the like) with the uplink data received in the initial transmission. The retransmitted uplink data in the case of the Silent NACK and the retransmitted uplink data in the case of NACK 1 are substantially the uplink data received first. Therefore, the base station apparatus 10 does not perform HARQ combining for those data, and performs detection processing. The base station apparatus 10 transmits an ACK/NACK for the uplink data (retransmission) (S207). FIG. 3 is a case that an ACK is received.

As described above, different NACKs are received depending on a cause of an error. Thus, the terminal apparatus can use a retransmission method based on the cause of the error. In the case of NACK 1, the presence of the DMRS is successfully recognized, and thus it is assumed that fading or the like is the main cause, rather than problems of received power, such as a path loss. Accordingly, the terminal apparatus 20 can perform retransmission using a grant-free transmission parameter that solves the cause. In the case of the Silent NACK, the presence of the DMRS is not successfully recognized, and thus it is assumed that low received power (low SNR) is the main cause. Accordingly, the terminal apparatus 20 can perform retransmission using a grant-free transmission parameter that solves the cause. In the case of NACK 2, a UE ID is identified because of correct terminal identification. Accordingly, grant-based retransmission can be performed for grant-free initial transmission, and therefore communication with high reliability as well as with low latency can be achieved.

Figure 4:
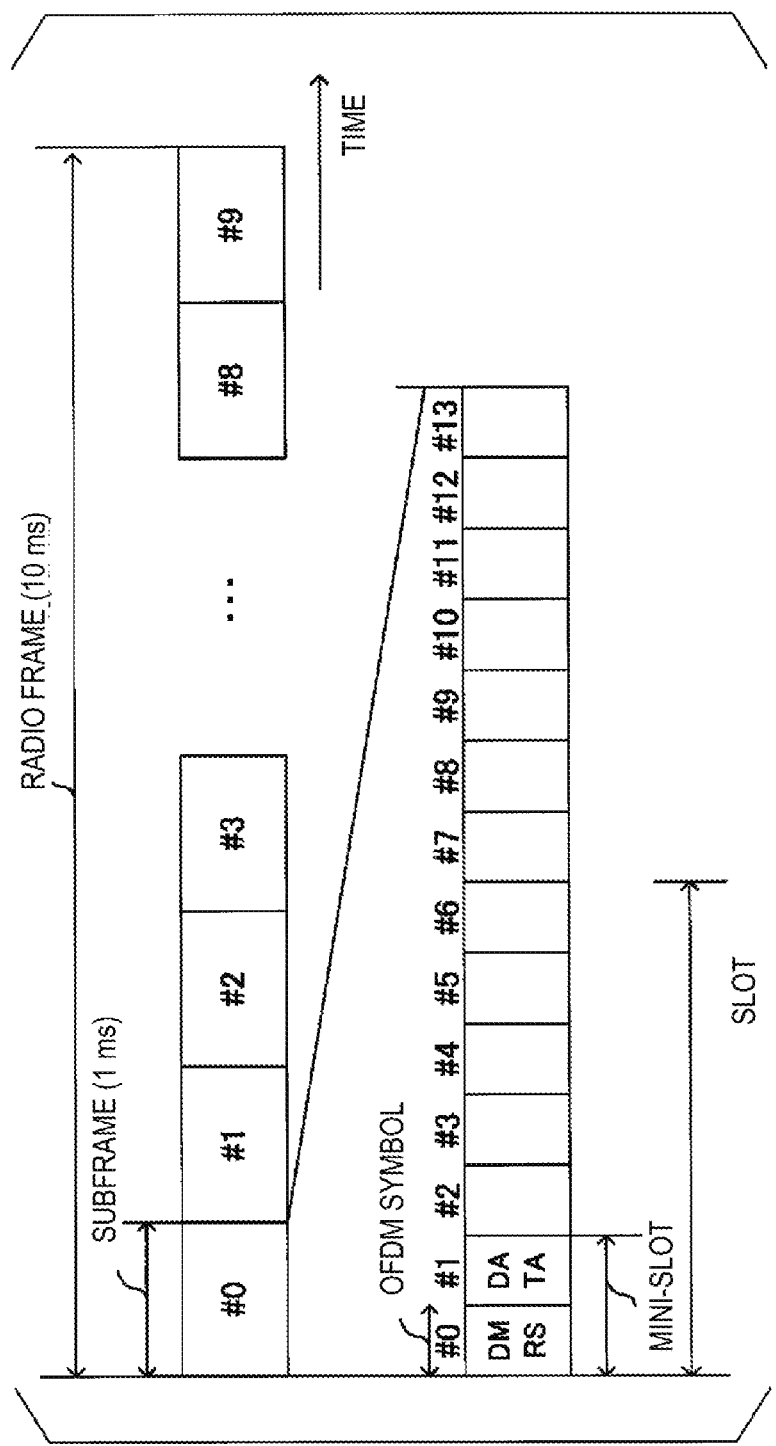
FIG. 4 is a diagram illustrating an example of a radio frame structure of the communication system according to the first embodiment.

FIG. 4 is a diagram illustrating an example of a radio frame structure of the communication system according to the present embodiment. In the communication system 1, one radio frame is defined to have a length of 10 ms in a fixed manner. One subframe is defined to have a length of 1 ms in a fixed manner. One radio frame includes 10 subframes. One slot is defined by the number of OFDM symbols. The number of slots included in one subframe varies depending on the number of OFDMs included in one slot. FIG. 4 is an example in which one slot includes seven OFDM symbols, which make a slot length 0.5 ms. In this case, one subframe includes two subframes. One mini-slot is defined by the number of OFDM symbols. The number of OFDM symbols included in a mini-slot is smaller than the number of OFDM symbols included in a slot. FIG. 4 is an example in which one mini-slot includes two OFDM symbols. In the communication system 1, a physical channel is mapped to radio resources in each slot or each mini-slot. FIG. 4 illustrates an example that uplink data in grant-free transmission is mapped in each mini-slot. In a mini-slot including two OFDM symbols, in the first OFDM symbol, the DMRS is continuously or discontinuously mapped (in the first OFDM symbol, uplink data may be mapped in a subcarrier in which the DMRS is not mapped). In the second OFDM symbol, uplink data (a PUSCH) is mapped. FIG. 4 is a case that the DMRS and the uplink data are mapped to neighboring OFDM symbols (OFDM symbol numbers #0 and #1). However, the DMRS and the uplink data may be mapped away from each other (e.g., a case that the DMRS is mapped to OFDM symbol number #0, and the uplink data is mapped to OFDM symbol number #2). A resource in which the uplink data is mapped may be recognized by being associated with a DMRS sequence. Note that, in a case that communication is performed by using DFT-s-OFDM, the OFDM symbol serves as a Single Carrier-Frequency Division Multiple Access (SC-FDMA) symbol.

The DMRS is used for identification (determination) of a terminal apparatus and for channel estimation for demodulation. The terminal apparatus 20 can cause the base station apparatus 10 to recognize that the terminal apparatus 20 has transmitted uplink data and to recognize a resource (a time resource/a frequency resource) in which uplink data is transmitted, by using the DMRS. For the DMRS, a known sequence determined in advance is used in the base station apparatus and the terminal apparatus. For example, in FIG. 4, a DMRS sequence is allocated to a frequency resource in one OFDM symbol. For the DMRS sequence, phase rotation, cyclic delay (cyclic shift), interleaving, Orthogonal Cover Code (OCC), and the like may further be performed. The base station apparatus can identify a terminal apparatus, by a DMRS sequence pattern, a phase rotation pattern, a cyclic delay pattern (a Cyclic shift pattern), an interleaving pattern, and an OCC pattern. With these, multiple DMRSs can be orthogonally multiplexed in the same radio resources, and therefore the number of terminal apparatuses that can be identified can be increased. The terminal apparatus 20 performs phase rotation, cyclic delay (cyclic shift), interleaving, and Orthogonal Cover Code (OCC) on the DMRS, based on the resource configuration for grant-free transmission. Note that, in FIG. 3, the DMRS and the uplink data are mapped in units of mini-slot, but may be mapped in units of slot.

Figure 5:
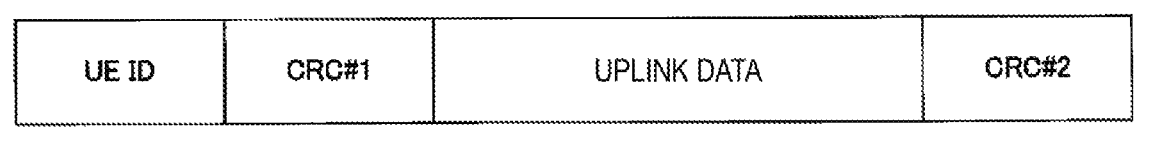

FIG. 5 is a diagram illustrating a format example of uplink data in grant-free transmission according to the present embodiment. In a case that the base station apparatus 10 transmits a PUSCH by grant-free, the base station apparatus 10 uses the format (S204 and S206 in FIG. 3). The format includes an uplink data part (uplink data field), a UE ID part (UE ID field), a first CRC part (CRC #1 or first CRC field), and a second CRC part (CRC #2 or second CRC field). In the uplink data part, uplink data bits $x_0, x_1, \ldots, x_{Kd-1}$ (Kd is an uplink data bit length) generated from the higher layer are stored. In the UE ID part, bits $y_0, y_1, \ldots, y_{Ku-1}$ (Ku is a UE ID bit length) representing an identifier (e.g., a C-RNTI) allocated to each terminal apparatus are stored. In CRC #1, first CRC parity bits $pp_0, pp_1, \ldots, pp_{K2P}$ (K2P is a second CRC parity bit length) generated from the identifier stored in the UE ID part by using a cyclic generator polynomial are stored (also referred to as first error detection bits). In the second CRC part, second CRC parity bits $p_0, p_1, \ldots, p_{K1P-1}$ (K1P is a first CRC parity bit length) generated from the uplink data bits by using a cyclic generator polynomial are stored (also referred to as second error detection bits).

The UE ID is associated with the DMRS. The bit sequence pp of CRC #1 generated from the UE ID is scrambled (scrambling is also referred to as exclusive OR operation or masking) by using the DMRS sequence (a sequence generated by a parameter related to the DMRS sequence may be used). The bit sequence p of CRC #2 is scrambled by using a sequence y representing the identifier stored in the UE ID part. As described above, the uplink data format in grant-free transmission includes uplink data and a UE ID, and a CRC is added to each of the uplink data and the UE ID (also referred to as separate coding). For example, in a case that a DMRS sequence length is 8 bits and that the number of bits Ku of the UE ID is 16 bits, the number of bits K1P of CRC #1 is 8 bits, and the number of bits K2P of CRC #2 is 16 bits. Note that the mapping order of the uplink data part, the UE ID part, CRC #1, and CRC #2 is not necessarily limited to the mapping order of FIG. 5, on the condition that these fields are included.

Figure 6:
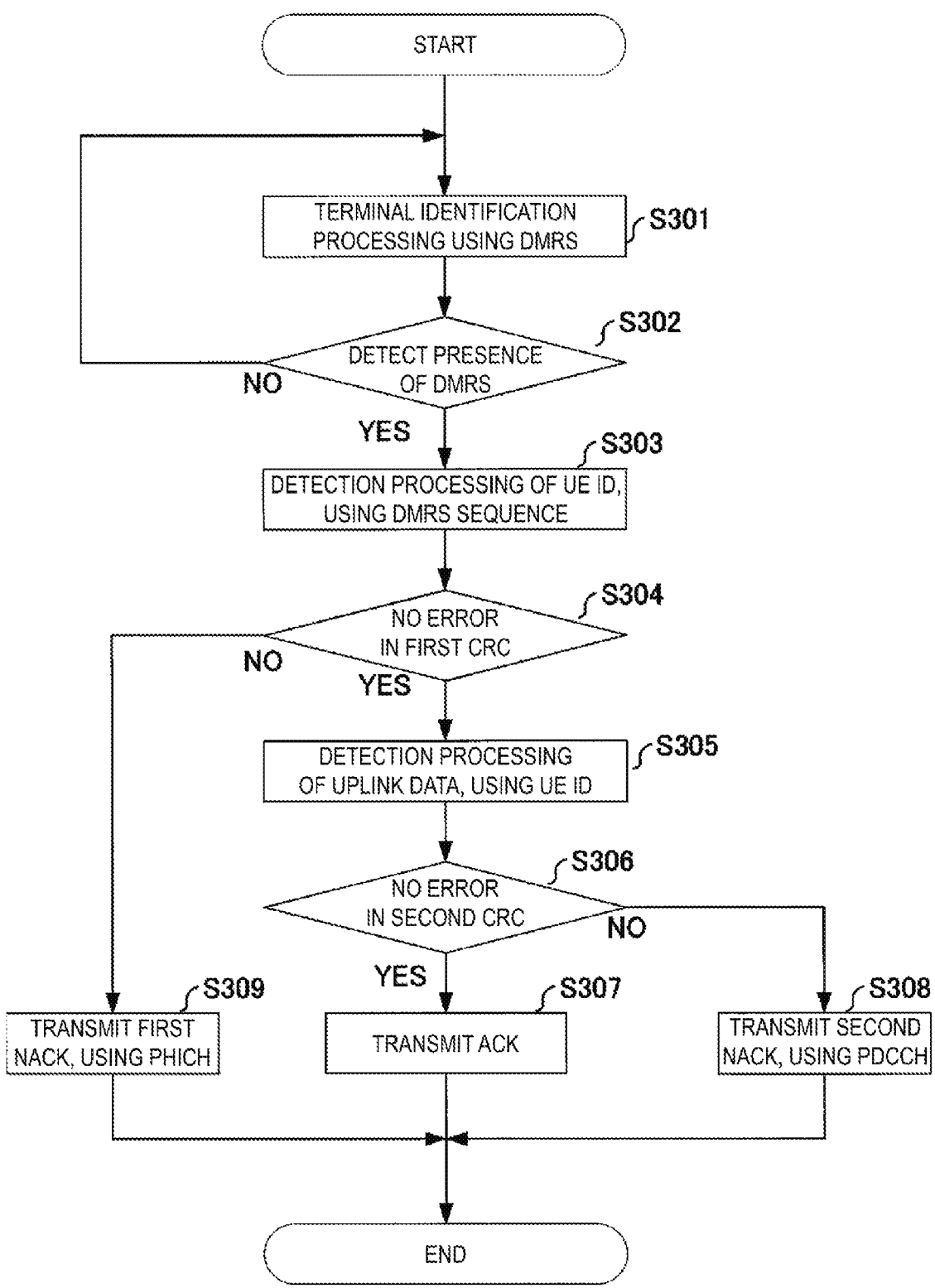
FIG. 6 is a diagram illustrating a transmission flowchart example of an ACK/NACK in grant-free transmission according to the first embodiment.

FIG. 6 is a diagram illustrating a transmission flowchart example of an ACK/NACK in grant-free transmission according to the present embodiment. The base station apparatus 10 that has received a DMRS and uplink data in the formats of FIGS. 4 and 5 identifies which of terminal apparatuses has transmitted the uplink data, by using the DMRS (S301, also referred to as coarse terminal identification processing). For example, the base station apparatus 10 performs identification processing through correlation processing using a DMRS sequence, in each OFDM symbol. In a case that the base station apparatus 10 fail to detect the DMRS (NO in S302), the base station apparatus 10 cannot transmit a NACK (Silent NACK). Thus, the base station apparatus 10 continues to detect another subsequent DMRS. In a case that the base station apparatus 10 detects the DMRS (YES in S302), the base station apparatus 10 determines that one of terminal apparatuses has transmitted uplink data, and performs detection processing of the uplink data by using the detected DMRS sequence (S303 to S309). The base station apparatus 10 can perform signal detection through turbo equalization or the like on an uplink data channel, by using the results of the terminal identification processing using the DMRS sequence and channel estimation.

The base station apparatus 10 performs descrambling processing (also referred to as exclusive OR operation or masking) on CRC #1 included in the uplink data, by using the detected DMRS sequence (S303, also referred to as fine terminal identification processing). In a case that an error is detected in CRC #1 (NO in S304), the base station apparatus 10 determines that the identification based on the DMRS detected in S302 is unreliable (the base station apparatus 10 failed to correctly identify a UE ID). In this case, the base station apparatus 10 transmits a first NACK, by using a PHICH (S309). The first NACK is indicated by a HARQ indicator "0" in the PHICH. The PHICH is generated by using a DMRS sequence used to scramble CRC #1. For example, for the cyclic shift amount n_DMRS of a DMRS included in the index n_seq indicating a spreading sequence used to multiply a PHICH, a cyclic shift amount performed on the DMRS sequence used to scramble CRC #1 is used. For the smallest resource block index I_RA in the first slot in which the DMRS included in the index n_seq indicating a spreading sequence used to multiply a PHICH/the uplink data is transmitted, a resource block to which the DMRS used to scramble CRC #1 or the PUSCH including CRC #1 is mapped is used. The PHICH is mapped to the radio resources n_RB, which are calculated based on the cyclic shift amount of the DMRS used to scramble CRC #1/the resource block to which the DMRS or the PUSCH including CRC #1 is mapped.

In a case that an error is not detected in CRC #1 (YES in S304), the base station apparatus 10 determines that the identification results using the DMRS were correct, and the identification of a terminal apparatus 20 to which the identifier stored in the UE ID part is allocated succeeded. In a case of YES in S304, the base station apparatus performs detection processing of the uplink data stored in the uplink data part, by using the UE ID (S305). Specifically, the base station apparatus 10 performs descrambling processing on CRC #2, by using the UE ID. In a case that an error is detected in CRC #2 (NO in S306), the base station apparatus 10 determines that the terminal identification succeeded but decoding of the uplink data failed. In this case, the base station apparatus 10 transmits a second NACK by using a PDCCH to the terminal apparatus that has transmitted the uplink data (S308). The second NACK is indicated by no toggling of an NDI in a PDCCH. The second NACK may be indicated by a field directly indicating a NACK in a PDCCH. A CRC added to the PDCCH on which the second NACK is transmitted is scrambled with the UE_ID (e.g., a C-RNTI).

In case that an error is not detected in CRC #2 (YES in S306), the base station apparatus 10 determines that the base station apparatus 10 correctly received uplink data, and transmits an ACK to the terminal apparatus that has transmitted the uplink data (S307). A CRC added to the PDCCH is scrambled by using the UE ID used to scramble CRC #2. Note that, for the ACK transmission, either a PHICH or a PDCCH may be used.

The terminal apparatus 20 can change a retransmission method and the like, depending on a control channel (i.e., a type of NACK) on which a NACK is received. It can also be said that the terminal apparatus 20 can change a retransmission method and the like, depending on an identifier performed on a control channel on which a NACK is received. For example, in a case that the terminal apparatus 20 receives a Silent NACK (in a case that the terminal apparatus 20 does not receive a NACK within a prescribed period of time, or in a case of NO in S302), the terminal apparatus 20 retransmits uplink data together with a DMRS the same as the DMRS in the initial transmission in grant-free transmission, by using radio resources different from the radio resources in the initial transmission. In a case that the terminal apparatus 20 receives a Silent NACK, the terminal apparatus 20 may increase density of a DMRS, and retransmit uplink data in grant-free transmission. In a case that the terminal apparatus 20 receives NACK 1 on a PHICH, the terminal apparatus 20 retransmits uplink data together with a DMRS different from the DMRS in the initial transmission in grant-free transmission, by using radio resources the same as the radio resources in the initial transmission. In a case that the terminal apparatus 20 receives NACK 2 on a PDCCH, the terminal apparatus 20 retransmits uplink data in grant-based transmission. The terminal apparatus 20 retransmits uplink data, in accordance with the radio resource allocation used for grand-based transmission, the MCS, and the RV that are received together with NACK 2.

As described above, in the grant-free transmission, the base station apparatus 10 transmits NACK 1 and NACK 2 by using different physical channels. The terminal apparatus 20 can recognize a cause of an error of uplink data, based on a physical channel on which a NACK is received. By using different physical channels for NACK 1 and NACK 2, two types of NACKs (NACK 1 and NACK 2) can be notified in a distinguishable manner with one bit. As a result, overhead can be reduced.

Note that, in the communication system of the present embodiment, as the PDCCH for transmitting NACK 2, a PDCCH transmitted to be shared by terminal apparatuses belonging to a specific group may be used. For example, the PDCCH transmitted to be shared by terminal apparatuses belonging to a specific group can be used to transmit resource configuration information for grant-free transmission, as well as transmitting NACK 2.

Figure 7:
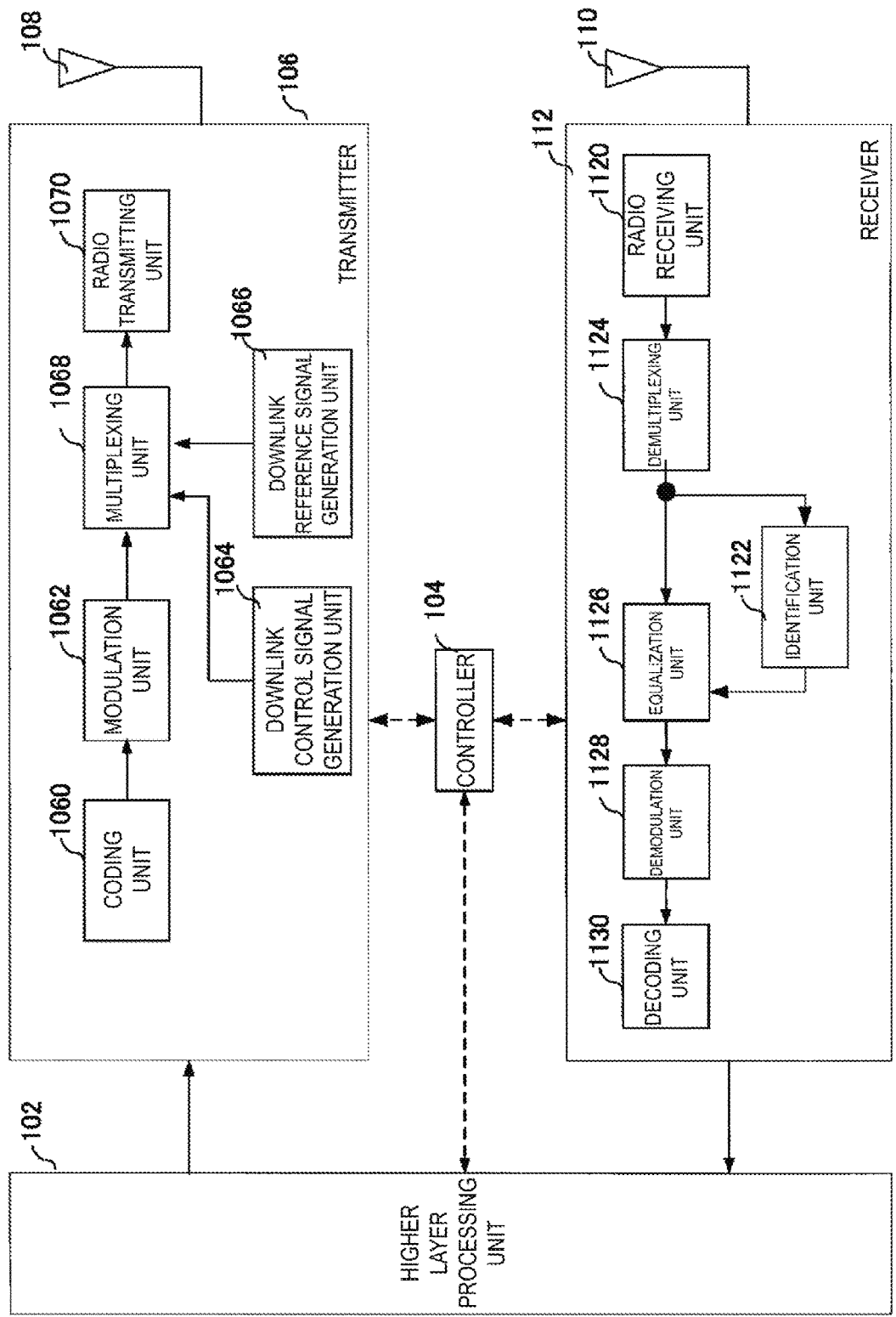
FIG. 7 is a schematic block diagram of a configuration of the base station apparatus according to the first embodiment.

FIG. 7 is a schematic block diagram of a configuration of the base station apparatus according to the present embodiment. The base station apparatus 10 includes a higher layer processing unit (higher layer processing step) 102, a controller (control step) 104, a transmitter (transmission step) 106, a transmit antenna 108, a receive antenna 110, and a receiver (reception step) 112. The transmitter 106 generates a physical downlink channel, according to a logical channel input from the higher layer processing unit 102. The transmitter 106 includes a coding unit (coding step) 1060, a modulation unit (modulation step) 1062, a downlink control signal generation unit (downlink control signal generation step) 1064, a downlink reference signal generation unit (downlink reference signal generation step) 1066, a multiplexing unit (multiplexing step) 1068, and a radio transmitting unit (radio transmission step) 1070. The receiver 112 detects (demodulates or decodes, for example) a physical uplink channel, and inputs the contents of the physical uplink channel to the higher layer processing unit 102. The receiver 112 includes a radio receiving unit (radio reception step) 1120, an identification unit (identification step) 1122, a demultiplexing unit (demultiplexing step) 1124, an equalization unit (equalization step) 1126, a demodulation unit (demodulation step) 1128, and a decoding unit (decoding step) 1130.

The higher layer processing unit 102 performs processing of higher layers of a physical layer, such as a Medium Access Control (MAC) layer, a Packet Data Convergence Protocol (PDCP) layer, a Radio Link Control (RLC) layer, and a Radio Resource Control (RRC) layer. The higher layer processing unit 102 generates information necessary for controlling the transmitter 106 and the receiver 112, and outputs the generated information to the controller 104. The higher layer processing unit 102 outputs downlink data (a DL-SCH or the like), system information (an MIB or an SIB), a HARQ indicator, or the like to the transmitter 106.

The higher layer processing unit 102 generates, or acquires from a higher node, system information (a part of an MIB or an SIB) to be broadcast. The higher layer processing unit 102 outputs the system information to be broadcast to the transmitter 106, as a BCH/DL-SCH. The MIB is mapped to a PBCH in the transmitter 106. The SIB is mapped to a PDSCH in the transmitter 106. The higher layer processing unit 102 generates, or acquires from a higher node, system information (SIB) specific to a terminal apparatus. The SIB is mapped to a PDSCH in the transmitter 106. The SIB may include the resource configuration for grant-free transmission.

The higher layer processing unit 102 configures various RNTIs for each terminal apparatus. The RNTI is used for encrypting (scrambling) of a PDCCH, a PDSCH, or the like. The RNTI can include an identifier specific to grant-free transmission. The higher layer processing unit 102 outputs the RNTI to the controller 104/the transmitter 106/the receiver 112.

The higher layer processing unit 102 generates, or acquires from a higher node, downlink data (a transport block or a DL-SCH) to be mapped to a PDSCH, system information (System Information Block (SIB)) specific to a terminal apparatus, an RRC message, a MAC CE, and the like, and outputs the downlink data and the like to the transmitter 106. The higher layer processing unit 102 manages various configuration information of the terminal apparatus 20. The various configuration information can include resource configuration for grant-free transmission in RRC signaling. The higher layer processing unit 102 determines the resource configuration for grant-free transmission for the terminal apparatus 20. Note that a part of the functions of the radio resource control may be performed in the MAC layer and the physical layer.

The higher layer processing unit 102 receives information related to a terminal apparatus, such as a function (UE capability) supported by of the terminal apparatus, from the terminal apparatus 20 (via the receiver 112). The terminal apparatus 20 transmits its function to the base station apparatus 10 with higher layer signaling (RRC signaling). The information related to a terminal apparatus includes information indicating whether the terminal apparatus supports a prescribed function, or information indicating that the terminal apparatus has completed introduction and testing of a prescribed function. Whether a prescribed function is supported includes whether introduction and testing of a prescribed function have been completed.

In a case that a terminal apparatus supports a prescribed function, the terminal apparatus transmits information (parameters) indicating whether the terminal apparatus supports the prescribed function. In a case that a terminal apparatus does not support a prescribed function, the terminal apparatus may be configured not to transmit information (parameters) indicating whether the terminal apparatus supports the prescribed function. In other words, whether the prescribed function is supported is reported by whether information (parameters) indicating whether the prescribed function is supported is transmitted. Note that the information (parameters) indicating whether a prescribed function is supported may be reported by using one bit of 1 or 0. The UE Capability includes information indicating that grant-free transmission is supported.

The higher layer processing unit 102 acquires a DL-SCH from decoded uplink data (also including a CRC), via the receiver 112. The higher layer processing unit 102 performs error detection of a UE ID and uplink data in the signal detection. The higher layer processing unit 102 generates a HARQ indicator (a bit sequence indicating an ACK/NACK), based on the error detection results. The HARQ indicator is output for each transport block. The higher layer processing unit 102 outputs the HARQ indicator to the transmitter 106. For example, the error detection is performed in the MAC layer.

The controller 104 performs control of the transmitter 106 and the receiver 112, based on various configuration information input from the higher layer processing unit 102/the receiver 112. The controller 104 generates downlink control information (DCI), based on the configuration information input from the higher layer processing unit 102/the receiver 112, and outputs the generated DCI to the transmitter 106. The controller 104 adds a CRC to the DCI. The controller 104 performs encrypting (scrambling) on the CRC, by using an RNTI. The controller 104 controls the receiver 112 and the transmitter 106, based on the resource configuration for grant-free transmission input from the higher layer processing unit 102. Note that a part of the functions of the controller 104 can be included in the higher layer processing unit 102 or in the processing in the physical layer.

The transmitter 106 generates a PBCH, a PHICH, a PDCCH, a PDSCH, a downlink reference signal, and the like, according to a signal input from the higher layer processing unit 102/the controller 104. The coding unit 1060 performs coding (including repetition), such as block coding, convolutional coding, and turbo coding, on the BCH, the DL-SCH, the HARQ indicator and the like input from the higher layer processing unit 102, by using a coding scheme that is determined in advance/that is determined by the higher layer processing unit 102. The coding unit 1060 punctures coded bits, based on a coding rate input from the controller 104. The modulation unit 1062 performs data modulation on the coded bits input from the coding unit 1060 with a modulation scheme (modulation order) that is determined in advance/that is input from the controller 104, such as BPSK, QPSK, 16QAM, 64QAM, and 256QAM.

The downlink control signal generation unit 1064 performs QPSK modulation on the DCI input from the controller and to which a CRC is added, and generates a PDCCH. The downlink reference signal generation unit 1066 generates a known sequence of the terminal apparatus as a downlink reference signal. The known sequence is determined according to a rule that is determined in advance based on a physical cell identity or the like for identifying the base station apparatus 10.

The multiplexing unit 1068 multiplexes modulation symbols of each channel input from the PDCCH/the downlink reference signal/the modulation unit 1062. In other words, the multiplexing unit 1068 maps the PDCCH/the downlink reference signal/modulation symbols of each channel to resource elements. The mapped resource elements are controlled by downlink scheduling input from the controller 104. The resource element is a minimum unit of a physical resource, which includes one OFDM symbol and one subcarrier. Note that, in a case of performing MIMO transmission, the transmitter 106 includes as many coding units 1060 and modulation units 1062 as the number of layers. In this case, the higher layer processing unit 102 configures an MCS for each transport block of each layer.

The radio transmitting unit 1070 performs Inverse Fast Fourier Transform (IFFT) on the multiplexed modulation symbols and the like to generate OFDM symbols. The radio transmitting unit 1070 adds cyclic prefixes (CPs) to the OFDM symbols to generate a baseband digital signal. The radio transmitting unit 1070 further converts the digital signal into an analog signal, removes unnecessary frequency components through filtering, performs up-conversion to a carrier frequency, performs power amplification, and outputs the resultant signal to the transmit antenna 108 for transmission.

In accordance with an indication from the controller 104, the receiver 112 detects (demultiplexes, demodulates, or decodes) the signal received from the terminal apparatus 20 via the receive antenna 110, and inputs the decoded data to the higher layer processing unit 102/the controller 104. The radio receiving unit 1120 converts an uplink signal received via the receive antenna 110 into a baseband signal by means of down-conversion, removes unnecessary frequency components, controls an amplification level in such a manner as to suitably maintain a signal level, performs orthogonal demodulation, based on an in-phase component and an orthogonal component of the received signal, and converts the orthogonally-demodulated analog signal into a digital signal. The radio receiving unit 1120 removes a portion corresponding to the CP from the converted digital signal. The radio receiving unit 1120 performs Fast Fourier Transform (FFT) on the signal from which the CP has been removed, and extracts a signal in the frequency domain. The signal in the frequency domain is output to the demultiplexing unit 1124.

The demultiplexing unit 1124 demultiplexes the signal input from the radio receiving unit 1120 into a PUSCH, a PUCCH, and a signal such as an uplink reference signal, based on uplink scheduling information (uplink data channel allocation information for grant-based transmission, resource configuration for grant-free transmission, or the like) input from the controller 104. The demultiplexed uplink reference signal is input to the identification unit 1122. The demultiplexed PUSCH and PUCCH are output to the equalization unit 1126.

The identification unit 1122 (also referred to as a channel processing unit) estimates a frequency response (or a delay profile), by using the uplink reference signal. The results of the frequency response obtained through channel estimation for demodulation are input to the equalization unit 1126. The channel estimation unit 2124 performs measurement of an uplink channel state (measurement of Reference Signal Received Power (RSRP), Reference Signal Received Quality (RSRQ), or a Received Signal Strength Indicator (RSSI)), by using the uplink reference signal. The measurement of the uplink channel state is used to determine an MCS for the PUSCH, for example.

The identification unit 1122 identifies (specifies) a terminal apparatus that transmitted uplink data by grant-free, by using the uplink reference signal (DMRS). For example, to identify a terminal apparatus, blind detection is performed, by using correlation processing between a DMRS (a DMRS based on resource configuration for grant-free transmission) held by the base station apparatus 10 and the extracted DMRS. The identification unit 1122 outputs the identification results of the terminal apparatus using the DMRS to the controller 104/the higher processing unit 102.

The equalization unit 1126 performs processing of compensating for influence in a channel, based on the frequency response input from the identification unit 1122. As a method of compensation, any existing channel compensation technique can be applied, such as a method of multiplication with MMSE weights and MRC weights, and a method of applying an MLD. The demodulation unit 1128 performs demodulation processing, based on information of a modulation scheme that is determined in advance/that is indicated by the controller 104. Note that, in a case that DFT-s-OFDM is used in the downlink, the demodulation unit 1128 performs demodulation processing on the resultant obtained by IDFT processing is performed on a signal output from the equalization unit 1126.

The decoding unit 1130 performs decoding processing on a signal output from the demodulation unit, based on information of a coding rate that is determined in advance/a coding rate that is indicated by the controller 104. The decoding unit 1130 inputs the decoded data (a UL-SCH or the like) to the higher layer processing unit 102. The higher layer processing unit 102 determines whether or not there is an error of the UE ID, by using CRC #1 included in the decoded data. The higher layer processing unit 102 determines whether or not there is an error of the uplink data, by using CRC #2 included in the decoded data.

Figure 8:
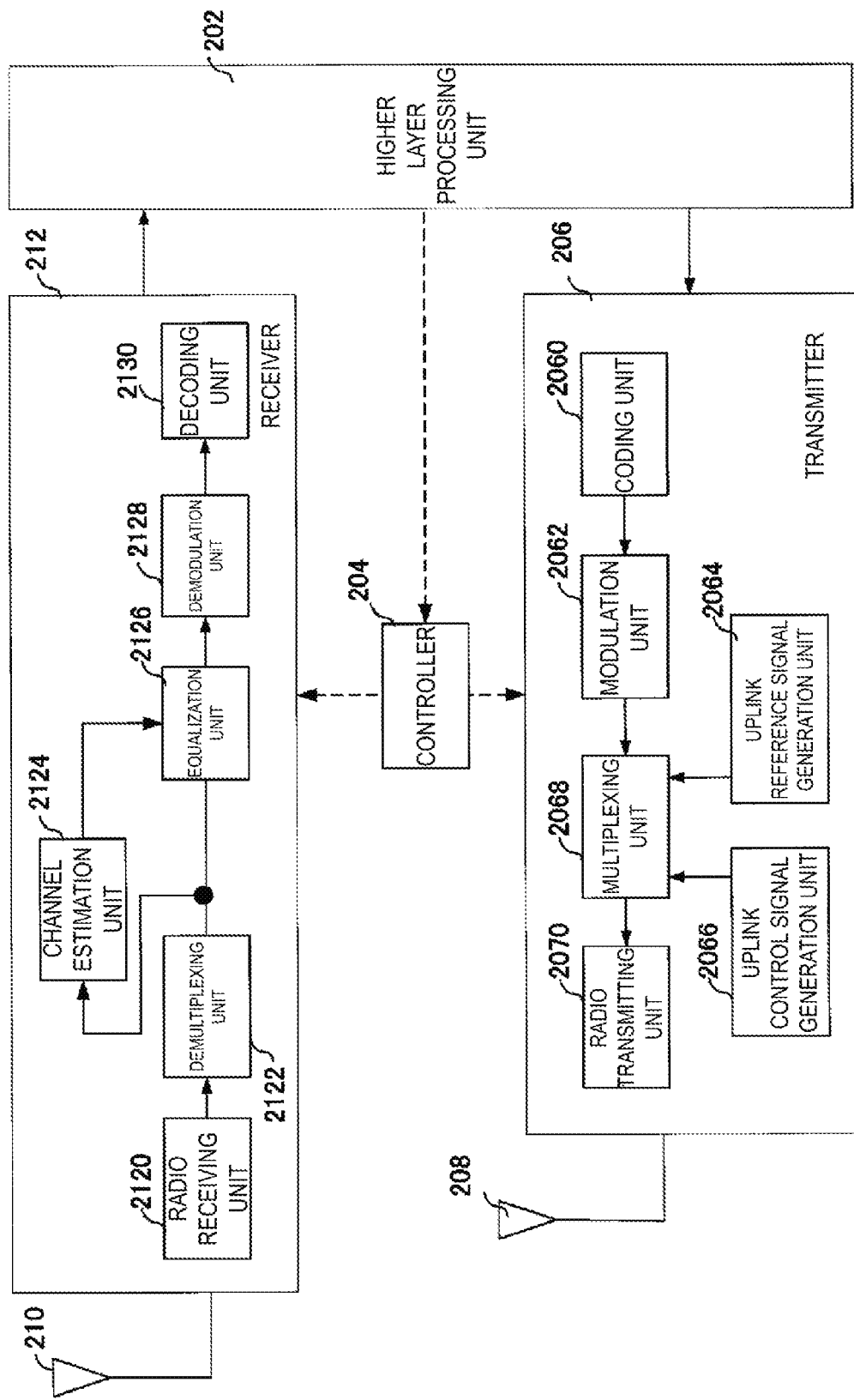
FIG. 8 is a schematic block diagram illustrating a configuration of the terminal apparatus according to the first embodiment.

FIG. 8 is a schematic block diagram illustrating a configuration of the terminal apparatus according to the present embodiment. The terminal apparatus 20 includes a higher layer processing unit (higher layer processing step) 202, a controller (control step) 204, a transmitter (transmission step) 206, a transmit antenna 208, a receive antenna 210, and a receiver (reception step) 212. The transmitter 206 includes a coding unit (coding step) 2060, a modulation unit (modulation step) 2062, an uplink reference signal generation unit (uplink reference signal generation step) 2064, an uplink control signal generation unit (uplink control signal generation step) 2066, a multiplexing unit (multiplexing step) 2068, and a radio transmitting unit (radio transmission step) 2070. The receiver 212 includes a radio receiving unit (radio reception step) 2020, a demultiplexing unit (demultiplexing step) 2122, a channel estimation unit (channel estimation step) 2124, an equalization unit (equalization step) 2126, a demodulation unit (demodulation step) 2128, and a decoding unit (decoding step) 2130.

The higher layer processing unit 202 performs processing of a medium access control (MAC) layer, a packet data convergence protocol (PDCP) layer, a radio link control (RLC) layer, and a radio resource control (RRC) layer. The higher layer processing unit 202 manages various configuration information of its terminal apparatus. The higher layer processing unit 202 notifies the base station apparatus 10 of information (UE Capability) indicating a terminal apparatus function supported by its terminal apparatus, via the transmitter 206. The higher layer processing unit 202 notifies of the UE Capability with RRC signaling. The UE Capability includes information indicating whether grant-free transmission is supported.

The higher layer processing unit 202 acquires, from the receiver 212, decoded data such as a DL-SCH and a BCH. The higher layer processing unit 202 generates an SR in grant-free transmission. The higher layer processing unit 202 generates downlink channel state information (CSI). The higher layer processing unit 202 generates a HARQ-ACK for downlink data. The higher layer processing unit 202 generates UCI including an SR/CSI (including a CQI report)/HARQ-ACK. The higher layer processing unit 202 inputs the UCI and a UL-SCH to the transmitter 206.

The higher layer processing unit 202 acquires, from the receiver 212, resource configuration for grant-free transmission included in RRC signaling/DCI, and inputs the resource configuration for grant-free transmission to the controller 204. The higher layer processing unit 202 generates a UL-SCH for grant-free transmission, based on the resource configuration. The controller 204 performs control on the transmitter 206, such as generation of a DMRS and radio resource allocation of a PUSCH and the DMRS, based on the resource configuration.

The higher layer processing unit 202 can interpret the resource configuration for grant-free transmission included in the DCI. The higher layer processing unit 202 acquires an ACK/NACK (including an NDI) for uplink data included in the DCI, and inputs the ACK/NACK to the controller 204. The higher layer processing unit 202 controls PUSCH retransmission, based on the ACK/NACK.

The higher layer processing unit 202 acquires, from the receiver 212, a HARQ indicator for uplink data. To generate a PHICH, the higher layer processing unit 202 inputs the HARQ indicator to the transmitter 206. The higher layer processing unit 202 indicates the controller 204 to perform PUSCH retransmission control, based on the HARQ indicator.

The higher layer processing unit 202 outputs uplink data generated by a user's operation or the like to the transmitter 206. The higher layer processing unit 202 can also output uplink data generated not by a user's operation (e.g., data acquired by a sensor) to the transmitter 206. In grant-free transmission, the higher layer processing unit 202 generates CRC #2 for the uplink data. The higher layer processing unit 202 generates CRC #1 for the UE ID (C-RNTI). CRC #2 is scrambled with the UE ID. CRC #1 is scrambled with a DMRS sequence, in accordance with DMRS parameters included in the resource configuration for grant-free transmission. The higher layer processing unit 202 inputs each bit sequence of the uplink data, the UE ID, CRC #1, and CRC #2 to the transmitter 206. Note that a part of the functions of the higher layer processing unit 202 may be included in the controller 204.

The controller 204 generates a control signal for controlling the transmitter 206 and the receiver 212, based on various configuration information input from the higher layer processing unit 202. The controller 204 generates uplink control information (UCI), based on information input from the higher layer processing unit 202, and outputs the UCI to the transmitter 206.

The coding unit 2060 performs coding, such as convolutional coding, block coding, and turbo coding, on the uplink data (in a case of grant-free transmission, uplink data, a UE ID, CRC #1, and CRC #2) and the like input from the higher layer processing unit 202, in accordance with control of the controller 204.

The modulation unit 2062 modulates the coded bits input from the coding unit 2060 with a modulation scheme that is indicated by the controller 204/a modulation scheme that is determined in advance for each channel, such as BPSK, QPSK, 16QAM, 64QAM, and 256QAM (generates modulation symbols for the PUSCH). Note that, in a case that DFT-S-OFDM is used, Discrete Fourier Transform (DFT) processing is performed after modulation.

The uplink reference signal generation unit 2064 generates a DMRS sequence that is determined according to a rule (formula) determined in advance, based on the DMRS parameters (a cyclic shift, a parameter value for generation of a DMRS sequence, and the like) included in the resource configuration for grant-free transmission, in accordance with an indication from the controller 204. The uplink reference signal generation unit 2064 performs phase rotation/cyclic delay/OCC/interleaving on the DMRS sequence, based on the resource configuration for grant-free transmission. The uplink reference signal generation unit 2064 further generates a Sounding Reference Signal (SRS) for CSI Measurement.

In accordance with an indication from the controller 204, the uplink control signal generation unit 2066 codes the UCI and performs BPSK/QPSK modulation on the coded UCI to generate modulation symbols for a PUCCH.

In accordance with uplink scheduling information from the controller 204 (uplink data channel allocation information for grant-based transmission, resource configuration for grant-free transmission, or the like), the multiplexing unit 2068 multiplexes modulation symbols for the PUSCH, modulation symbols for the PUCCH, and the uplink reference signal for each transmit antenna port (i.e., each signal is mapped to resource elements).

The radio transmitting unit 2070 performs Inverse Fast Fourier Transform (IFFT) on the multiplexed signal to generate OFDM symbols. The radio transmitting unit 2070 adds CPs to the OFDM symbols to generate a baseband digital signal. The radio transmitting unit 2070 further converts the baseband digital signal into an analog signal, removes unnecessary frequency components, performs conversion to a carrier frequency by means of up-conversion, performs power amplification, and transmits the resultant signal to the base station apparatus 10 via the transmit antenna 208.

The radio receiving unit 2120 converts a downlink signal received via the receive antenna 210 into a baseband signal by means of down-conversion, removes unnecessary frequency components, controls an amplification level in such a manner as to suitably maintain a signal level, performs orthogonal demodulation, based on an in-phase component and an orthogonal component of the received signal, and converts the orthogonally-demodulated analog signal into a digital signal. The radio receiving unit 2120 removes a portion corresponding to the CP from the converted digital signal, performs FFT on the signal from which the CP has been removed, and extracts a signal in the frequency domain.

The demultiplexing unit 2122 demultiplexes the extracted signal in the frequency domain into a downlink reference signal, a PDCCH, a PDSCH, and PBCH. The channel estimation unit 2124 estimates a frequency response (or a delay profile), by using the downlink reference signal (a DM-RS or the like). The results of the frequency response obtained through channel estimation for demodulation are input to the equalization unit 1126. The channel estimation unit 2124 performs measurement of uplink channel state (measurement of Reference Signal Received Power (RSRP), Reference Signal Received Quality (RSRQ), a Received Signal Strength Indicator (RSSI), and a Signal to Interference plus Noise power Ratio (SINR)), by using downlink reference signal (a CSI-RS or the like). The measurement results of the downlink channel state are used to determine CSI of the higher layer processing unit 202, for example.

The equalization unit 2126 generates equalizing weights based on the MMSE criterion, from the frequency response input from the channel estimation unit 2124. The equalization unit 2126 multiplies the signal (the PUCCH, the PDSCH, the PBCH, or the like) input from the demultiplexing unit 2122 by the equalizing weights. The demodulation unit 2128 performs demodulation processing, based on information of a modulation order that is determined in advance/that is indicated by the controller 204.

The decoding unit 2130 performs decoding processing on a signal output from the demodulation unit 2128, based on information of a coding rate that is determined in advance/a coding rate that is indicated by the controller 204. The decoding unit 2130 inputs the decoded data (a DL-SCH or the like) to the higher layer processing unit 202.

As described above, in the communication system according to the present embodiment, in grant-free transmission, different NACKs are transmitted, depending on a cause of transmitting a NACK. Each NACK is transmitted in a different physical channel. A physical channel on which each NACK is transmitted is associated with DMRS parameters/a UE ID of a terminal apparatus. With this configuration, a terminal apparatus can efficiently perform retransmission control, in consideration of a cause of an error in grant-free transmission.

Second Embodiment

The communication system according to the present embodiment is an aspect in which different NACKs are transmitted by using PDCCHs in grant-free transmission. The communication system according to the present embodiment includes the base station apparatus 10 and the terminal apparatus 20 described in FIG. 7 and FIG. 8. The difference/addition from/to the first embodiment will be mainly described below.

Figure 9:
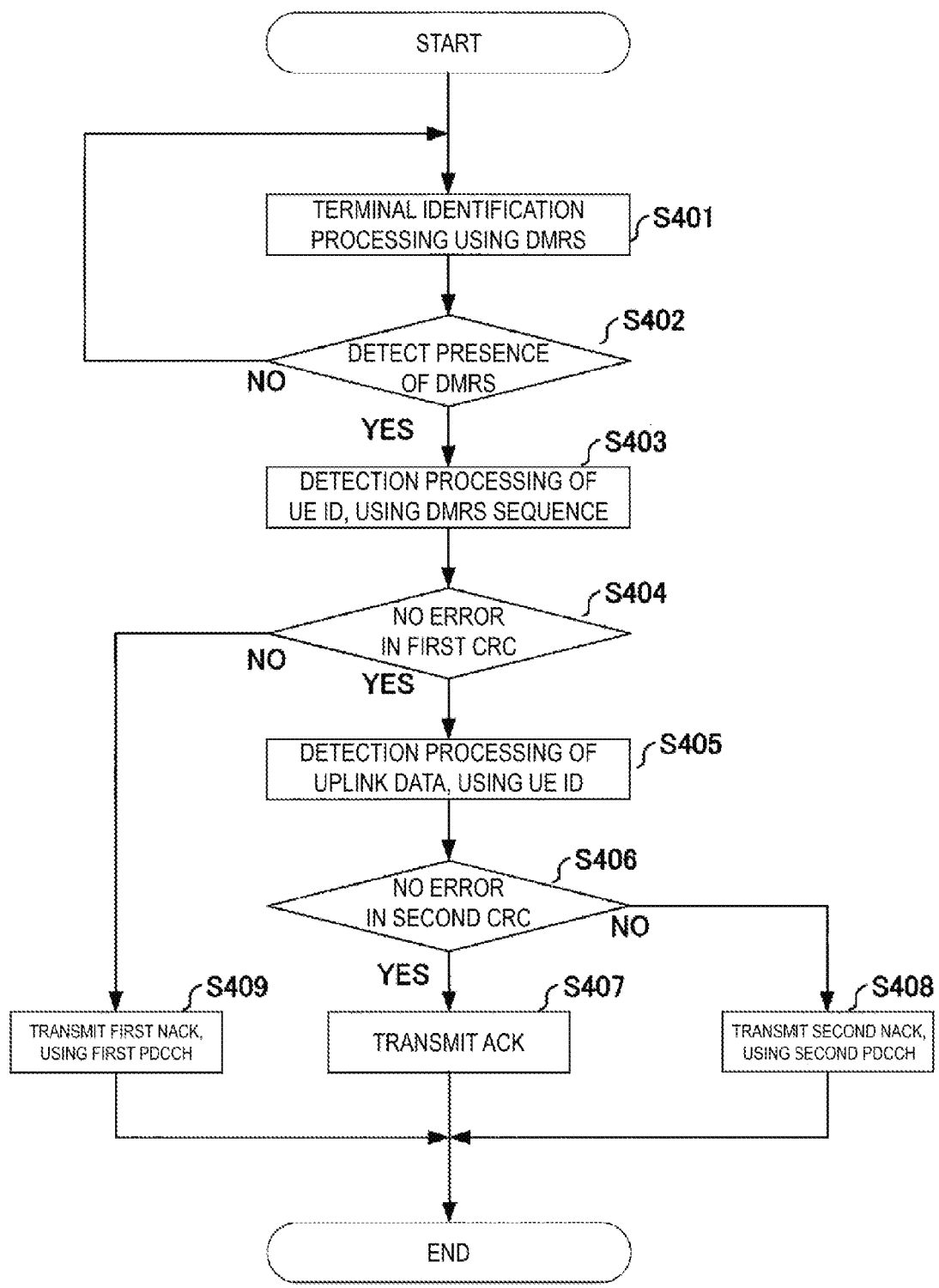
FIG. 9 is a diagram illustrating a transmission flowchart example of an ACK/NACK in grant-free transmission according to a second embodiment.

FIG. 9 is a diagram illustrating a transmission flowchart example of an ACK/NACK in grant-free transmission according to the present embodiment. The base station apparatus 10 that has received a DMRS and uplink data in the formats of FIGS. 4 and 5 identifies which of terminal apparatuses has transmitted the uplink data, by using the DMRS (S401, also referred to as coarse terminal identification processing). The base station apparatus 10 performs identification processing through correlation processing using a DMRS sequence, in each OFDM symbol. In a case that the base station apparatus 10 fails to detect the DMRS (NO in S402), the base station apparatus 10 cannot transmit a NACK (Silent NACK). Thus, the base station apparatus 10 continues to detect another subsequent DMRS. In a case that the base station apparatus 10 detects the DMRS (YES in S402), the base station apparatus 10 determines that one of terminal apparatuses has transmitted uplink data, and performs detection processing of the uplink data by using the detected DMRS sequence (S403 to S409). The base station apparatus 10 can perform signal detection through turbo equalization or the like on an uplink data channel, by using the results of the terminal identification processing using the DMRS sequence and channel estimation.

The base station apparatus 10 performs descrambling processing (also referred to as exclusive OR operation or masking) on CRC #1 included in the uplink data, by using the detected DMRS sequence (S403, also referred to as fine terminal identification processing). In a case that an error is detected in CRC #1 (NO in S404), the base station apparatus 10 determines that the identification based on the DMRS detected in S402 is unreliable (the base station apparatus 10 failed to correctly identify a UE ID). In this case, the base station apparatus 10 transmits a first NACK, by using a first PDCCH (S409). The first NACK is indicated by a HARQ indicator "0" in the first PDCCH.

A CRC added to the first PDCCH is scrambled by using a sequence (a DMRS sequence identifier) associated with the DMRS used to scramble CRC #1. The DMRS sequence identifier is generated by using a time resource (subframe number/slot number/mini-slot number/system frame number) in which the DMRS is transmitted. The DMRS sequence identifier may be generated by using a frequency resource in which the DMRS is transmitted. For example, with the use of a subframe number of a subframe in which the DMRS is transmitted, in a case that the DMRS sequence identifier satisfies "DMRS sequence identifier=1+subframe number of a subframe in which DMRS is transmitted (0≤subframe number<10)", the base station apparatus can recognize a subframe number of a subframe in which the DMRS is received, and can thereby calculate the DMRS sequence identifier. With this configuration, note that, a calculation formula of the DMRS associated sequence can also include an index indicating a frequency resource in which the DMRS is transmitted. In a case that the number of bits of a CRC added to a PDCCH is 16 bits, and that the base station apparatus receives the DMRS in subframe number #4, the DMRS sequence identifier is "0000000000000101". Note that the DMRS sequence identifier may be generated by using a slot number of a slot/mini-slot number of mini-slot in which the DMRS is transmitted (in a calculation formula of the DMRS sequence identifier, "subframe number of a subframe in which DMRS is transmitted" is replaced by "slot number of a slot in which DMRS is transmitted" or "mini-slot number of a mini-slot in which DMRS is transmitted"). The DMRS sequence identifier may be associated with the parameter of cyclic cyclic shift n_DMRS performed on the DMRS used to scramble CRC #1.

As another aspect, the CRC added to the first PDCCH may be scrambled by using a sequence associated with uplink data (a PUSCH) associated with the DMRS used to scramble CRC #1. For example, with the use of a subframe number of a subframe in which the uplink data is transmitted, the sequence associated with uplink data satisfies "sequence associated with uplink data=1+subframe number of a subframe in which uplink data is transmitted (0≤subframe number<10)". With this configuration, the base station apparatus 10 can recognize the received DMRS, and can thereby calculate the sequence associated with the uplink data, by using the fact that the DMRS and radio resources to which the uplink data is mapped are associated with each other. Note that the first PDCCH can include NACK 1 for multiple users.

In a case that an error is not detected in CRC #1 (YES in S404), the base station apparatus 10 determines that the identification results using the DMRS are correct, and the identification of a terminal apparatus 20 to which the identifier stored in the UE ID part is allocated succeeded. In a case of YES in S404, the base station apparatus performs detection processing of the uplink data stored in the uplink data part, by using the UE ID (S405). Specifically, the base station apparatus 10 performs descrambling processing on CRC #2, by using the UE ID. In a case that an error is detected in CRC #2 (NO in S406), the base station apparatus 10 determines that the terminal identification succeeded but decoding of the uplink data failed. In this case, the base station apparatus 10 transmits a second NACK by using a second PDCCH to the terminal apparatus that has transmitted the uplink data (S408). The second NACK is indicated by no toggling of an NDI in a PDCCH. The second NACK may be indicated by a field directly indicating a NACK in a second PDCCH. A CRC added to the second PDCCH is scrambled with the UE_ID (e.g., a C-RNTI).

In case that an error is not detected in CRC #2 (YES in S406), the base station apparatus 10 determines that the base station apparatus 10 correctly received uplink data, and transmits an ACK to the terminal apparatus that has transmitted the uplink data (S407). A CRC added to the PDCCH is scrambled by using the UE ID used to scramble CRC #2.

In the communication system according to the present embodiment, CRCs having different numbers of bits may be added to the first PDCCH and the second PDCCH. For example, an 8-bit CRC is added to the first PDCCH, and a 16-bit CRC is added to the second PDCCH. In this case, in S409, the CRC added to the first PDCCH is scrambled by using an 8-bit DMRS sequence identifier. For the 8-bit DMRS sequence identifier, the DMRS sequence itself may be used. In contrast, the CRC (16 bits) for the second PDCCH is scrambled with the UE ID.

In the communication system according to the present embodiment, different search spaces may be used for the first PDCCH and the second PDCCH. A search space is a radio resource space searched by the terminal apparatus to perform blind decoding of a PDCCH. The first PDCCH is mapped to a region that can be searched in a shared manner, irrespective of a terminal apparatus (common search space). In contrast, the second PDCCH is mapped to a region allowed to be searched by a specific terminal apparatus (UE specific search space). The terminal apparatus can distinguish types of NACKs, based on a region in which a PDCCH is decoded. With this configuration, in grant-free transmission, the base station apparatus 10 and the terminal apparatus 20 can determine whether a NACK is NACK 1 or NACK 2, based on a search space, as well as based on a sequence performed on a CRC of a PDCCH.

The communication system of the present embodiment may use a PDCCH transmitted to be shared by terminal apparatuses belonging to a specific group as the first PDCCH on which NACK 1 is transmitted, and may use a second PDCCH transmitted specifically to an individual terminal apparatus as the second PDCCH on which NACK 2 is transmitted. For example, the PDCCH transmitted to be shared by terminal apparatuses belonging to a specific group is used to transmit resource configuration information for grant-free transmission, as well as transmitting a NACK. The PDCCH transmitted to be shared by terminal apparatuses belonging to a specific group may include information associated with a slot format, as well as a NACK. The information associated with a slot format is the number of OFDM symbols for a slot in which a PUSCH is transmitted, for example. The second PDCCH transmitted specifically to an individual terminal apparatus is used to transmit resource allocation for grant-based transmission, an MCS, and the like, as well as transmitting NACK 2 (an NDI). With this configuration, in grant-free transmission, the base station apparatus 10 and the terminal apparatus 20 can determine whether a NACK is NACK 1 or NACK 2, based on an application of a PDCCH, as well as based on a sequence performed on a CRC of a PDCCH.

The terminal apparatus 20 can change a retransmission method and the like, depending on a control channel (i.e., a type of NACK) on which a NACK is received. It can also be said that the terminal apparatus 20 can change a retransmission method and the like, depending on an identifier performed on a control channel on which a NACK is received. For example, in a case that the terminal apparatus 20 receives a Silent NACK (in a case that the terminal apparatus 20 does not receive a NACK within a prescribed period of time, or in a case of NO in S302), the terminal apparatus 20 retransmits uplink data together with a DMRS the same as the DMRS in the initial transmission in grant-free transmission, by using radio resources different from the radio resources in the initial transmission. In a case that the terminal apparatus 20 receives a Silent NACK, the terminal apparatus 20 may increase density of a DMRS, and retransmit uplink data in grant-free transmission. In a case that the terminal apparatus 20 receives NACK 1 on a first PDCCH, the terminal apparatus 20 retransmits uplink data together with a DMRS different from the DMRS in the initial transmission in grant-free transmission, by using radio resources the same as the radio resources in the initial transmission. In a case that the terminal apparatus 20 receives NACK 2 on a second PDCCH, the terminal apparatus 20 retransmits uplink data in grant-based transmission. The terminal apparatus 20 retransmits uplink data, in accordance with the radio resource allocation used for grand-based transmission, the MCS, and the RV that are received together with NACK 2.

As described above, in the grant-free transmission, the base station apparatus 10 and the terminal apparatus 20 change a sequence used to scramble a CRC of a PDCCH, depending on a type of NACK (NACK 1 and NACK 2). In the case of NACK 1, a CRC of a PDCCH is scrambled by using a sequence generated in association with a DMRS. In the case of NACK 2, a CRC of a PDCCH is scrambled by using a UE ID. With this configuration, the terminal apparatus 20 can recognize a cause of an error of uplink data, based on a CRC of a PDCCH on which a NACK is received. Since whether a NACK is NACK 1 or NACK 2 can be determined based on a CRC of a PDCCH, two types of NACKs (NACK 1 and NACK 2) can be notified in a distinguishable manner with one bit. As a result, an overhead can be reduced. Note that, in the first embodiment and the second embodiment, a PHICH, a first PDCCH, and a first PDCCH are collectively referred to as a control channel or a control signal.

In the grant-free transmission of Embodiment 1 and Embodiment 2, the terminal apparatus 20 can repeatedly transmit the same PUSCH (the same transport block). The base station apparatus 10 can transmit NACK 1/NACK 2 before K times of repetition end, where K represents the number of times of repetition. In a case that the terminal apparatus 20 receives NACK 1 before transmitting a k-th (k<K) PUSCH, the terminal apparatus 20 may change a DMRS parameter, and transmit k-th and subsequent PUSCHs. In a case that the terminal apparatus 20 receives NACK 2 before transmitting a k-th (k<K) PUSCH, the terminal apparatus 20 may cancel transmission of k-th and subsequent PUSCHs by grant-free, and transmit the PUSCHs in grant-based transmission. With this configuration, uplink transmission with low latency and high reliability can be achieved.

Note that, in Embodiment 1 and Embodiment 2, in a case that the terminal apparatus 20 receives different NACKs for the same PUSCH (the same transport block), the terminal apparatus 20 may prioritize NACK 2 and perform retransmission processing. In Embodiment 1, in a case that the terminal apparatus 20 receives ACK/NACKs on both of a PHICH and a PDCCH, the terminal apparatus 20 adopts an ACK/NACK received on the PDCCH, and performs retransmission processing. In Embodiment 2, in a case that the terminal apparatus 20 receives ACK/NACKs on both of a first PDCCH and a second PDCCH, the terminal apparatus 20 adopts an ACK/NACK received on the second PDCCH. Such a configuration can prevent radio resources reserved by the base station apparatus 10 for uplink transmission from being wasted.

Note that one aspect of the present invention can also adopt the following aspects.

(1) One aspect of the present invention is a base station apparatus for communicating with a terminal apparatus, the base station apparatus including: a receiver configured to receive a physical uplink shared channel, and a reference signal used to demodulate the physical uplink shared channel; and a transmitter configured to transmit a signal indicating a delivery confirmation for the physical uplink shared channel, wherein the physical uplink shared channel includes uplink data bits, identifier bits indicating a terminal apparatus that has transmitted the uplink data, first Cyclic Redundancy Check (CRC) bits generated from the identifier bits, and second CRC bits generated from the uplink data bits, in a case that an error is detected based on the first CRC bits, the transmitter transmits a first Negative Acknowledgement (NACK) by using a control signal associated with a sequence of the reference signal, and in a case that an error is detected based on the second CRC bits, the transmitter transmits a second NACK by using a control signal associated with an identifier indicating the terminal apparatus.

(2) In one aspect of the present invention, the transmitter transmits resource configuration information including number of times the physical uplink shared channel is repeatedly transmitted, by using the control signal associated with the sequence of the reference signal.

(3) In one aspect of the present invention, the receiver multiplies a bit indicating the first NACK by a spreading code sequence identified by using cyclic shift performed on the sequence of the reference signal, and generates the control signal associated with the sequence of the reference signal, and the receiver adds, to a bit indicating the second NACK, CRC bits scrambled with the identifier indicating the terminal apparatus, and generates the control signal associated with the identifier indicating the terminal apparatus.

(4) In one aspect of the present invention, the receiver adds, to a bit indicating the first NACK, CRC bits scrambled with an identifier generated by using radio resources to which the sequence of the reference signal is mapped, and generates the control signal associated with the sequence of the reference signal, and the receiver adds, to a bit indicating the second NACK, CRC bits scrambled with the identifier indicating the terminal apparatus, and generates the control signal associated with the identifier indicating the terminal apparatus.

(5) One aspect of the present invention is a communication method used for a base station apparatus for communicating with a terminal apparatus, the communication method including: a reception step of receiving a physical uplink shared channel, and a reference signal used to demodulate the physical uplink shared channel; and a transmission step of transmitting a signal indicating a delivery confirmation for the physical uplink shared channel, wherein the physical uplink shared channel includes uplink data bits, identifier bits indicating a terminal apparatus that has transmitted the uplink data, first CRC bits generated from the identifier bits, and second CRC bits generated from the uplink data bits, in the reception step, the first CRC bits are descrambled by using a sequence of the reference signal, and the second CRC bits are descrambled by using an identifier indicating the terminal apparatus, in the transmission step, in a case that an error is detected based on the first CRC bits, a first NACK is transmitted by using a control signal associated with the sequence of the reference signal, and in a case that an error is detected based on the second CRC bits, a second NACK is transmitted by using a control signal associated with the identifier indicating the terminal apparatus.

(6) One aspect of the present invention is a terminal apparatus for communicating with a base station apparatus, the terminal apparatus including: a transmitter configured to transmit a physical uplink shared channel, and a reference signal used to demodulate the physical uplink shared channel; and a receiver configured to receive a signal indicating a delivery confirmation for the physical uplink shared channel, wherein the physical uplink shared channel includes uplink data bits, identifier bits indicating a terminal apparatus that has transmitted the uplink data, first CRC bits generated from the identifier bits, and second CRC bits generated from the uplink data bits, the transmitter scrambles the first CRC bits by using a sequence of the reference signal, and scrambles the second CRC bits by using an identifier indicating the terminal apparatus, in a case that the receiver receives a NACK on a control signal associated with the sequence of the reference signal, the receiver interprets that identification of the terminal apparatus has failed, in a case that the receiver receives a NACK on a control signal associated with the identifier indicating the terminal apparatus, the receiver interprets that decoding of uplink data has failed, and in a case that the receiver receives neither of the control signals within a prescribed period of time, the receiver interprets that the reference signal has not been recognized.

(7) One aspect of the present invention is a communication method used for a terminal apparatus for communicating with a base station apparatus, the communication method including: a transmission step of transmitting a physical uplink shared channel, and a reference signal used to demodulate the physical uplink shared channel; and a reception step of receiving a signal indicating a delivery confirmation for the physical uplink shared channel, wherein the physical uplink shared channel includes uplink data bits, identifier bits indicating a terminal apparatus that has transmitted the uplink data, first CRC bits generated from the identifier bits, and second CRC bits generated from the uplink data bits, in the transmission step, the first CRC bits are scrambled by using a sequence of the reference signal, and the second CRC bits are scrambled by using an identifier indicating the terminal apparatus, in the reception step, in a case that a NACK is received on a control signal associated with the sequence of the reference signal, it is interpreted that identification of the terminal apparatus has failed, in a case that a NACK (is received on a control signal associated with the identifier indicating the terminal apparatus, it is interpreted that decoding of uplink data has failed, and in a case that neither of the control signals is received within a prescribed period of time, it is interpreted that the reference signal has not been recognized.

A program running on an apparatus according to one aspect of the present invention may serve as a program that controls a Central Processing Unit (CPU) and the like to cause a computer to operate in such a manner as to realize the functions of the embodiments according to one aspect of the present invention. Programs or the information handled by the programs are temporarily stored in a volatile memory, such as a Random Access Memory (RAM), a non-volatile memory, such as a flash memory, a Hard Disk Drive (HDD), or another storage device system. Note that a program for realizing the functions of the embodiments according to one aspect of the present invention may be recorded on a computer-readable recording medium. This configuration may be realized by causing a computer system to read the program recorded on the recording medium for execution. It is assumed that the "computer system" herein refers to a computer system built into the apparatuses, and the computer system includes an operating system and hardware components such as a peripheral device. Furthermore, the "computer-readable recording medium" may be a semiconductor recording medium, an optical recording medium, a magnetic recording medium, a medium that dynamically retains a program for a short period of time, or another computer-readable recording medium.

Furthermore, each functional block or various characteristics of the apparatuses used in the above-described embodiments may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible that one or more aspects of the present invention use a new integrated circuit based on the technology.

Note that the invention of the present patent application is not limited to the above-described embodiments. In the embodiments, apparatuses have been described as an example, but the invention of the present patent application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses, for example.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

One aspect of the present invention can be preferably used in a base station apparatus, a terminal apparatus, and a communication method. One aspect of the present invention can be utilized, for example, in a communication system, communication equipment (for example, a cellular phone apparatus, a base station apparatus, a radio LAN apparatus, or a sensor device), an integrated circuit (for example, a communication chip), or a program.

REFERENCE SIGNS LIST

1 Communication system
10 Base station apparatus
20-1 to 20-$n$ Terminal apparatus
10$a$ Range in which base station apparatus 10 can connect to terminal apparatus
102 Higher layer processing unit
104 Controller
106 Transmitter
108 Transmit antenna
110 Receive antenna
112 Receiver
1060 Coding unit
1062 Modulation unit
1064 Downlink control signal generation unit
1066 Downlink reference signal generation unit
1068 Multiplexing unit
1070 Radio transmitting unit
1120 Radio receiving unit
1122 Identification unit
1124 Demultiplexing unit
1126 Equalization unit
1128 Demodulation unit
1130 Decoding unit
202 Higher layer processing unit
204 Controller
206 Transmitter
208 Transmit antenna
210 Receive antenna
212 Receiver
2060 Coding unit 2062 Modulation unit
2064 Uplink reference signal generation unit
2066 Uplink control signal generation unit
2068 Multiplexing unit
2070 Radio transmitting unit
2120 Radio receiving unit
2122 Demultiplexing unit
2124 Channel estimation unit
2126 Equalization unit
2128 Demodulation unit
2130 Decoding unit

The invention claimed is:

1. A base station apparatus for communicating with a terminal apparatus, the base station apparatus comprising:
a receiver configured to receive a physical uplink shared channel, and a reference signal used to demodulate the physical uplink shared channel; and
a transmitter configured to transmit a signal indicating a delivery confirmation for the physical uplink shared channel, wherein
the physical uplink shared channel includes uplink data bits, identifier bits indicating a terminal apparatus that has transmitted the uplink data bits, first Cyclic Redundancy Check (CRC) bits generated from the identifier bits, and second CRC bits generated from the uplink data bits,
in a case that an error is detected based on the first CRC bits, the transmitter transmits a first Negative Acknowledgement (NACK) by using a control signal associated with a sequence of the reference signal, and
in a case that an error is detected based on the second CRC bits, the transmitter transmits a second NACK by using a control signal associated with an identifier indicating the terminal apparatus.

2. The base station apparatus according to claim 1, wherein
the transmitter transmits resource configuration information including a number of times the physical uplink shared channel is repeatedly transmitted, by using the control signal associated with the sequence of the reference signal.

3. The base station apparatus according to claim 1, wherein
the receiver multiplies a bit indicating the first NACK by a spreading code sequence identified by using cyclic shift performed on the sequence of the reference signal, and generates the control signal associated with the sequence of the reference signal, and
the receiver adds, to a bit indicating the second NACK, CRC bits scrambled with the identifier indicating the terminal apparatus, and generates the control signal associated with the identifier indicating the terminal apparatus.

4. The base station apparatus according to claim 1, wherein
the receiver adds, to a bit indicating the first NACK, CRC bits scrambled with an identifier generated by using radio resources to which the sequence of the reference signal is mapped, and generates the control signal associated with the sequence of the reference signal, and
the receiver adds, to a bit indicating the second NACK, CRC bits scrambled with the identifier indicating the terminal apparatus, and generates the control signal associated with the identifier indicating the terminal apparatus.

5. A communication method used for a base station apparatus for communicating with a terminal apparatus, the communication method comprising:
a reception step of receiving a physical uplink shared channel, and a reference signal used to demodulate the physical uplink shared channel; and
a transmission step of transmitting a signal indicating a delivery confirmation for the physical uplink shared channel, wherein
the physical uplink shared channel includes uplink data bits, identifier bits indicating a terminal apparatus that has transmitted the uplink data bits, first Cyclic Redundancy Check (CRC) bits generated from the identifier bits, and second CRC bits generated from the uplink data bits,
in the reception step, the first CRC bits are descrambled by using a sequence of the reference signal, and the second CRC bits are descrambled by using an identifier indicating the terminal apparatus,
in the transmission step, in a case that an error is detected based on the first CRC bits, a first Negative Acknowledgement (NACK) is transmitted by using a control signal associated with the sequence of the reference signal, and
in a case that an error is detected based on the second CRC bits, a second NACK is transmitted by using a control signal associated with the identifier indicating the terminal apparatus.

6. A terminal apparatus for communicating with a base station apparatus, terminal apparatus comprising:
a transmitter configured to transmit a physical uplink shared channel, and a reference signal used to demodulate the physical uplink shared channel; and
a receiver configured to receive a signal indicating a delivery confirmation for the physical uplink shared channel, wherein
the physical uplink shared channel includes uplink data bits, identifier bits indicating a terminal apparatus that has transmitted the uplink data bits, first Cyclic Redundancy Check (CRC) bits generated from the identifier bits, and second CRC bits generated from the uplink data bits,
the transmitter scrambles the first CRC bits by using a sequence of the reference signal, and scrambles the second CRC bits by using an identifier indicating the terminal apparatus,
in a case that the receiver receives a Negative Acknowledgement (NACK) on a control signal associated with the sequence of the reference signal, the receiver interprets that identification of the terminal apparatus has failed,
in a case that the receiver receives a NACK on a control signal associated with the identifier indicating the terminal apparatus, the receiver interprets that decoding of the uplink data bits has failed, and
in a case that the receiver receives neither of the control signals within a prescribed period of time, the receiver interprets that the reference signal has not been recognized.

7. A communication method used for a terminal apparatus for communicating with a base station apparatus, the communication method comprising:
a transmission step of transmitting a physical uplink shared channel, and a reference signal used to demodulate the physical uplink shared channel; and a reception step of receiving a signal indicating a delivery confirmation for the physical uplink shared channel, wherein the physical uplink shared channel includes uplink data bits, identifier bits indicating a terminal apparatus that has transmitted the uplink data bits, first Cyclic Redundancy Check (CRC) bits generated from the identifier bits, and second CRC bits generated from the uplink data bits, in the transmission step, the first CRC bits are scrambled by using a sequence of the reference signal, and the second CRC bits are scrambled by using an identifier indicating the terminal apparatus, in the reception step, in a case that a Negative Acknowledgement (NACK) is received on a control signal associated with the sequence of the reference signal, it is interpreted that identification of the terminal apparatus has failed, in a case that a NACK(is received on a control signal associated with the identifier indicating the terminal apparatus, it is interpreted that decoding of the uplink data bits has failed, and in a case that neither of the control signals is received within a prescribed period of time, it is interpreted that the reference signal has not been recognized.

* * * * *